US010041649B1

(12) United States Patent
David

(10) Patent No.: US 10,041,649 B1
(45) Date of Patent: Aug. 7, 2018

(54) FILTERS FOR CIRCADIAN LIGHTING

(71) Applicant: SORAA, INC., Fremont, CA (US)

(72) Inventor: Aurelien J. F. David, San Francisco, CA (US)

(73) Assignee: Soraa Inc., Fremont, CA (US)

( * ) Notice: Subject to any disclaimer, the term of this patent is extended or adjusted under 35 U.S.C. 154(b) by 119 days.

(21) Appl. No.: 14/819,010

(22) Filed: Aug. 5, 2015

Related U.S. Application Data

(60) Provisional application No. 62/033,487, filed on Aug. 5, 2014.

(51) Int. Cl.

| | |
|---|---|
| ***F21V 8/00*** | (2006.01) |
| ***F21V 23/02*** | (2006.01) |
| ***F21V 23/04*** | (2006.01) |
| ***F21V 9/08*** | (2018.01) |
| ***G02F 1/1335*** | (2006.01) |
| ***F21V 9/16*** | (2006.01) |
| ***F21V 9/00*** | (2018.01) |
| ***F21K 99/00*** | (2016.01) |
| *F21Y 101/02* | (2006.01) |

(52) U.S. Cl.
CPC .................. *F21V 9/00* (2013.01); *F21K 9/56* (2013.01); *F21Y 2101/02* (2013.01)

(58) Field of Classification Search
CPC ............. H05B 33/086; H05B 37/0281; F21W 2101/02; F21V 23/006; F21V 29/74; G02B 6/0073; G02F 1/133603; A61M 21/00; A61M 2021/0044; F21K 9/23; F21K 9/238; F21S 4/20
See application file for complete search history.

(56) References Cited

U.S. PATENT DOCUMENTS

| | | | | |
|---|---|---|---|---|
| 8,506,114 | B2 * | 8/2013 | Van De Ven | F21K 9/00 362/227 |
| 8,643,038 | B2 * | 2/2014 | Collins | C09K 11/0883 252/301.36 |
| 8,921,875 | B2 * | 12/2014 | LeToquin | H01L 25/0753 257/12 |
| 9,374,876 | B2 * | 6/2016 | Alpert | H05B 37/0281 |
| 9,526,143 | B1 * | 12/2016 | Petluri | H05B 33/0863 |
| 2016/0023017 | A1 * | 1/2016 | Moore-Ede | A61N 5/0618 607/88 |
| 2017/0138570 | A1 * | 5/2017 | Ouderkirk | F21V 7/00 |

* cited by examiner

*Primary Examiner* — Anh Mai
*Assistant Examiner* — Arman B Fallahkair

(57) ABSTRACT

A light source comprising: (a) An LED source comprising at least one LED emitting an LED emission and at least one wavelength-converting material configured to convert a fraction of the LED emission, the LED source emitting a primary SPD; and (b) at least one optical element configured to interact with the primary SPD to remove radiation in the primary SPD, such that a final SPD is emitted from the light source; wherein a fraction of the primary SPD in the wavelength range 430-500 nm is less than 5%; and a fraction of the final SPD in the wavelength range 430-500 nm is less than 1%.

14 Claims, 27 Drawing Sheets

1A

| | |
|---|---|
| SiOx | 99.9 |
| NbOx | 4.3 |
| SiOx | 305.2 |
| NbOx | 12.8 |
| SiOx | 286.3 |
| NbOx | 18.4 |
| SiOx | 134.8 |
| NbOx | 6.5 |
| SiOx | 136.5 |
| NbOx | 15.3 |
| SiOx | 132.8 |
| NbOx | 14.9 |
| SiOx | 130.7 |
| NbOx | 13.9 |
| SiOx | 128.4 |
| NbOx | 17.6 |
| SiOx | 127.4 |
| NbOx | 17.0 |
| SiOx | 128.2 |
| NbOx | 15.3 |
| SiOx | 127.7 |
| NbOx | 18.6 |
| SiOx | 126.3 |
| NbOx | 17.7 |
| SiOx | 125.9 |
| NbOx | 16.3 |
| SiOx | 125.3 |
| NbOx | 19.8 |
| SiOx | 126.1 |
| NbOx | 16.4 |
| SiOx | 128.2 |
| NbOx | 15.5 |
| SiOx | 127.7 |
| NbOx | 19.7 |
| SiOx | 127.4 |
| NbOx | 14.9 |
| SiOx | 128.1 |
| NbOx | 14.6 |
| SiOx | 124.3 |
| NbOx | 23.9 |
| SiOx | 268.5 |
| NbOx | 32.5 |
| SiOx | 260.0 |
| NbOx | 17.5 |
| SiOx | 155.5 |
| NbOx | 7.0 |
| SiOx | 39.7 |
| NbOx | 7.7 |
| SiOx | 117.9 |

Notch Filter Material

1D
Colorimetric Properties

| | initial | filtered |
|---|---|---|
| CRI | 82 | 80 |
| CCT | 3000 | 2860 |
| Du'v' | 0 | 7 |
| % of SPD in CSR | 3.5 | 0.2 |

2A

2B

Colorimetric Properties

| | initial | filtered |
|---|---|---|
| CRI | 87 | 80 |
| CCT | 3016 | 3000 |
| Du'v' | 10 | 0 |
| % of SPD in CSR | 4.1 | 0.2 |

3A
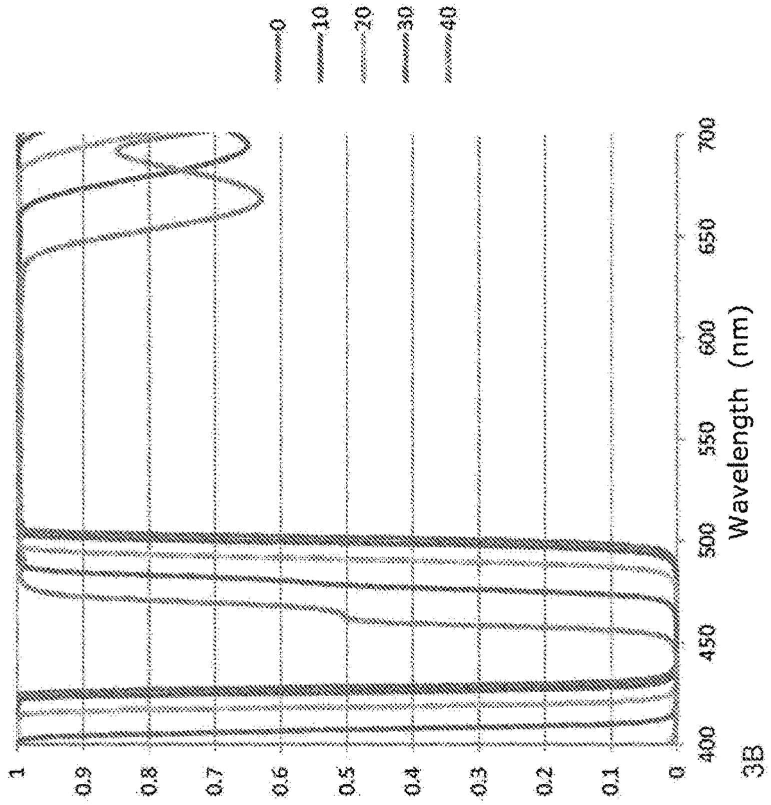
3B
| Angle | 0 | 10 | 20 | 30 | 40 |
|---|---|---|---|---|---|
| Ra | 80 | 80 | 84 | 77 | 73 |
| CCT | 2861 | 2860 | 2839 | 2824 | 2874 |
| Du'v' | 7 | 9 | 17 | 22 | 24 |
Colorimeteric Quantities Based on Angle
3C
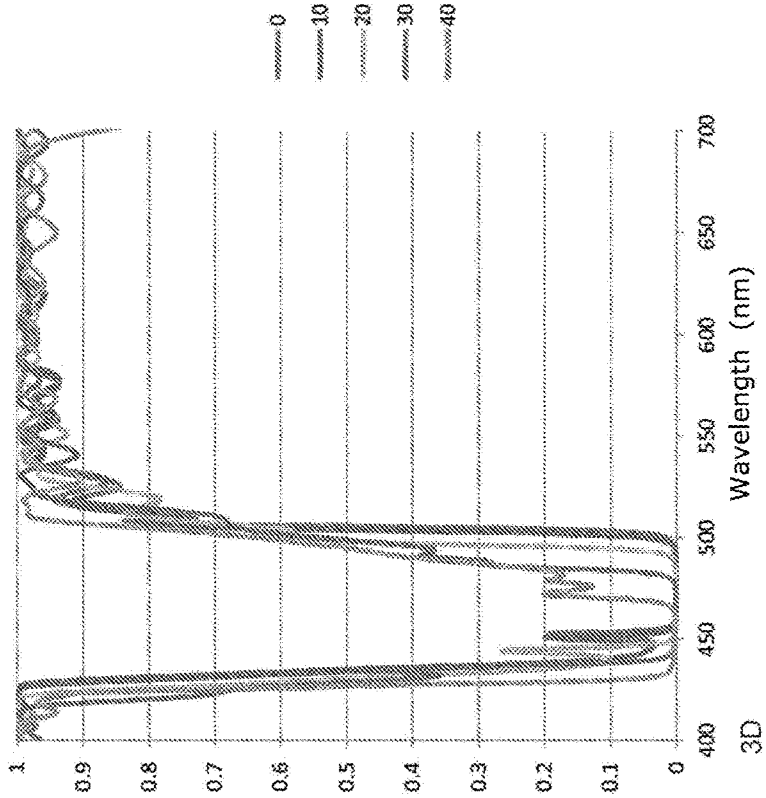
3D
| Angle | 0 | 10 | 20 | 30 | 40 |
|---|---|---|---|---|---|
| Ra | 79 | 79 | 80 | 81 | 81 |
| CCT | 2790 | 2788 | 2777 | 2793 | 2862 |
| Du'v' | 1 | 1 | 3 | 6 | 9 |
Colorimeteric Quantities Based on Angle
FIG. 3A-3D

3E

Notch Filter Material

| | |
|---|---|
| NbOx | 13.96 |
| SiOx | 57.14 |
| NbOx | 6.21 |
| SiOx | 265.95 |
| NbOx | 6.37 |
| SiOx | 136.32 |
| NbOx | 3.05 |
| SiOx | 191.77 |
| NbOx | 4.37 |
| SiOx | 236.38 |
| NbOx | 0.3 |
| SiOx | 50.36 |
| NbOx | 157.43 |
| SiOx | 37.86 |
| NbOx | 89.64 |
| SiOx | 12.11 |
| NbOx | 77.94 |
| SiOx | 32.58 |
| NbOx | 73.23 |
| SiOx | 23.67 |
| NbOx | 95.34 |
| SiOx | 19.8 |
| NbOx | 51.62 |
| SiOx | 292.08 |
| NbOx | 11.71 |
| SiOx | 146.62 |
| NbOx | 5.22 |
| SiOx | 147.9 |
| NbOx | 10.92 |
| SiOx | 299.57 |
| NbOx | 46.13 |
| SiOx | 29.57 |
| NbOx | 89.5 |
| SiOx | 23.5 |
| NbOx | 84.93 |
| SiOx | 26.29 |
| NbOx | 77.96 |
| SiOx | 29.42 |
| NbOx | 77.9 |
| SiOx | 31.29 |
| NbOx | 79.94 |
| SiOx | 26.04 |
| NbOx | 82.79 |
| SiOx | 25.86 |
| NbOx | 82.15 |
| SiOx | 27.04 |
| NbOx | 79.81 |
| SiOx | 27.64 |
| NbOx | 80.56 |
| SiOx | 18.81 |
| NbOx | 87.5 |
| SiOx | 24.57 |
| NbOx | 96.92 |
| SiOx | 11.36 |
| NbOx | 70.59 |
| SiOx | 32.97 |
| NbOx | 97.68 |
| SiOx | 18.74 |
| NbOx | 37.56 |
| SiOx | 57.3 |
| NbOx | 13.03 |

FIG. 3E

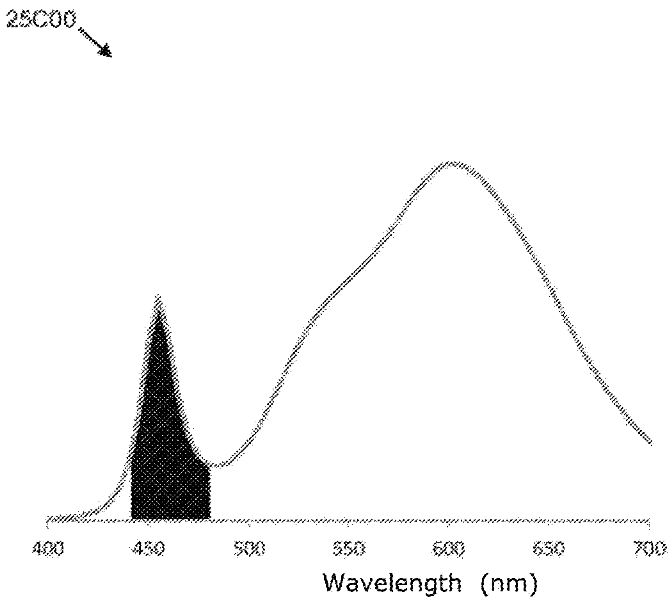
FIG. 14C
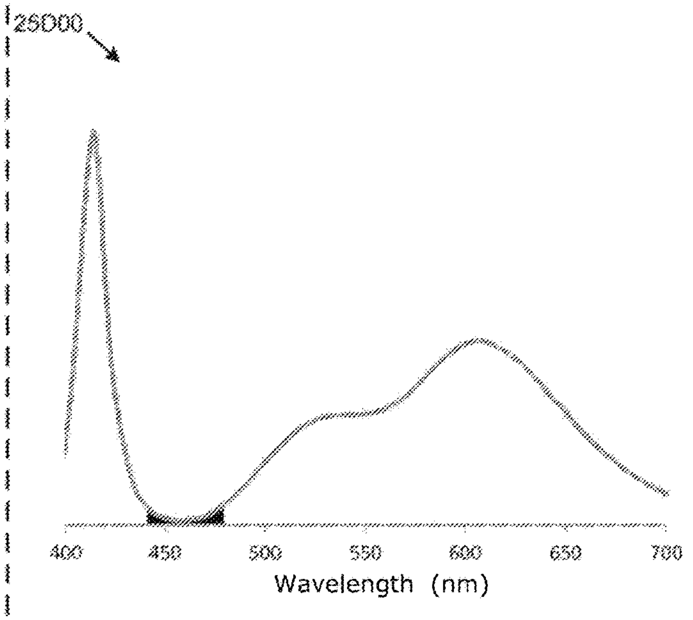
FIG. 14D
25E00
Color Coordinates (u'v') & Distance to Planckian Locus (Duv) for Different Filter Configuations
| | filter window | u' | v' | Duv (x1E-3) |
|---|---|---|---|---|
| Conventional unfiltered | - | 0.2518 | 0.52232 | 0.15055 |
| Embodiment unfiltered | - | 0.25063 | 0.52379 | 1.4767 |
| Conventional wide filter | 430-490 | 0.25762 | 0.55731 | 20.544 |
| Embodiment wide filter | 430-490 | 0.25275 | 0.53406 | 7.1983 |
| Conventional narrow filter | 440-480 | 0.25621 | 0.55378 | 18.676 |
| Embodiment narrow filter | 440-480 | 0.25134 | 0.52791 | 3.8054 |
FIG. 14E

FILTERS FOR CIRCADIAN LIGHTING

CROSS-REFERENCE TO RELATED APPLICATIONS

This application claims the benefit of U.S. Provisional Application No. 62/033,487, filed Aug. 5, 2014, the entire disclosure of which is incorporated herein by reference.

FIELD

The disclosure relates to the field of LED lighting products and more particularly to techniques for making and using filters for circadian lighting.

BACKGROUND

Identification of non-visual photoreceptors in the human eye (so-called intrinsically photosensitive retinal ganglion cells, or "ipRGCs") linked to the circadian system has sparked considerable interest in the effects of various light spectra on health and amenity for human beings. High circadian stimulation may lead to positive effects such as resetting sleep patterns, boosting mood, increasing alertness and cognitive performance, and alleviating seasonal affective depression. However, mis-timed circadian stimulation can also associated with disruption of the internal biological clock and melatonin suppression, and may be linked to illnesses such as cancer, heart disease, obesity and diabetes.

Circadian stimulation is associated with glucocorticoid elevation and melatonin suppression and is most sensitive to light in the blue wavelength regime. With the preponderance of light-emitting diode (LED) illumination products being based on blue-primary phosphor-converted white-emitting LEDs, the situation has developed that most LED-based illumination sources have higher levels of circadian stimulation than the traditional sources they are intended to replace.

In addition, illumination products are rarely tunable (other than mere dimming), and legacy illumination products fail to address the impact on humans with respect to diurnal or circadian cycles. Still worse, legacy illumination products that are ostensibly tunable fail to produce good color rendering throughout the tunable range.

What is needed is a technique or techniques for constructing illumination products in which light emission (e.g., LED light emission) can be controlled to provide varying levels of circadian stimulation while providing desirable light quality aspects such as correlated color temperature (CCT) and color rendering index (CRI). Also needed is an illumination system in which a first ratio and a second ratio of light emission are such that changing from the first ratio to the second ratio varies relative circadian stimulation while maintaining a CRI above 80 and maintaining the CCT within a prescribed range.

Lighting designers desire conveniences to implement varying levels of circadian stimulation while providing desirable light quality aspects, however until now, it has been too inconvenient or impossible, and/or the operational issues for doing so was too burdensome. Filters are needed. Indeed, it would be helpful if an LED lamp could be configured with mateable retaining rings delivered in a kit form such that interchangeable rings can be mated to a filter for circadian lighting. Therefore, there is a need for improved approaches.

SUMMARY

In a first aspect, light sources are provided comprising: at least one filter; at least one first LED emission source characterized by a first emission, wherein the first emission is configured to be filtered by the filter; at least one second LED emission source characterized by a second emission; wherein the first emission and the second emission are configured to provide a first combined emission and a second combined emission; wherein the first combined emission is characterized by a first spectral power distribution (SPD), a fraction Fv1, and a fraction Fc1, wherein, Fv1 represents the fraction of power of the first SPD in the wavelength range from 400 nm to 440 nm; and Fc1 represents the fraction of power of the first SPD in the wavelength range from 440 nm to 500 nm; the second combined emission is characterized by a second SPD, fraction Fv2, and fraction Fc2, wherein, Fv2 represents the fraction of power of the second SPD in the wavelength range from 400 nm to 440 nm; and Fc2 represents the fraction of power of the second SPD in the wavelength range from 440 nm to 500 nm; the first SPD and the second SPD are characterized by a color rendering index greater than 80; Fc1 is less than 0.01; Fv1 is at least 0.05; and Fc2 is at least 0.1.

In certain aspects, a light source provided by a light source of the present disclosure is characterized by a ratio Fc1/Fv1 is less than 0.1.

BRIEF DESCRIPTION OF THE DRAWINGS

Those skilled in the art will understand that the drawings, described herein, are for illustration purposes only. The drawings are not intended to limit the scope of the present disclosure.

FIGS. 1A-1D, FIGS. 2A-2B, FIGS. 3A-3E, FIGS. 4A-4C, FIGS. 5A-5B and FIGS. 6A-6B provide circadian filters and properties of circadian filters, according to some embodiments.

FIGS. 14A-E depict examples using dielectric stacks and compares filtered SPDs under varying conditions, according to some embodiments.

DETAILED DESCRIPTION

Figures 1A, 1B, 1C, 1D:
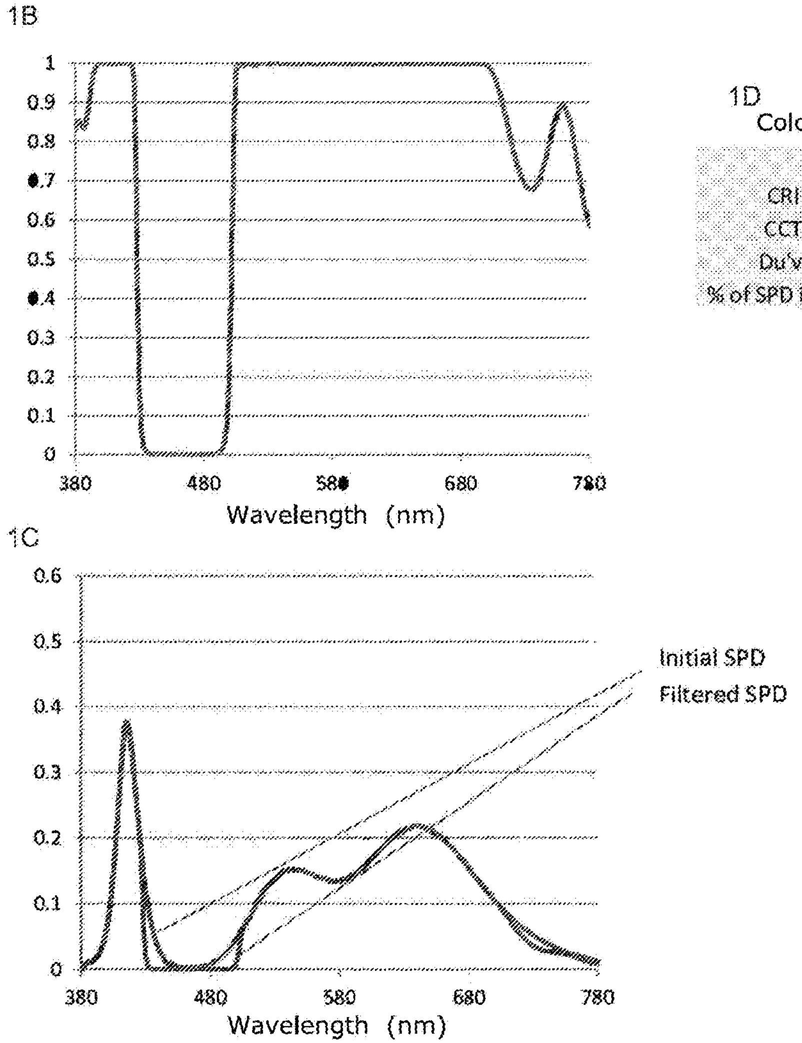

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an" as used in this application and the appended claims should generally be construed to mean "one or more" unless specified otherwise or is clear from the context to be directed to a singular form.

The term "logic" means any combination of software or hardware that is used to implement all or part of the disclosure.

The term "non-transitory computer readable medium" refers to any medium that participates in providing instructions to a logic processor.

A "module" includes any mix of any portions of computer memory and any extent of circuitry including circuitry embodied as a processor.

Reference is now made in detail to certain embodiments. The disclosed embodiments are not intended to be limiting of the claims.

The disclosure herein describes designs and uses of an interchangeable retaining ring kit for mating to an LED lamp heatsink.

In prior disclosure, we showed how the combination of violet LEDs and properly-chosen phosphors enabled a reduction of CS by an order of magnitude or more versus standard light sources—by removing radiation in the circadian spectral range of maximal stimulation, which we will call CSR.

In some cases it is desirable to reduce the CS by two orders of magnitude or more. For instance, this is the case in an environment where there is a large illuminance (such as several hundreds or thousands of lux). Indeed, in this case the circadian response is "saturated": for instance, melatonin suppression is complete after a 90 min and reducing the CS by only an order of magnitude still yields significant suppression. In some cases, it is difficult to attain such low levels of CS by combining a violet LED and conventional phosphors because the violet LED and the yellow/green phosphor have residual emission tails in the CSR.

As mentioned in the disclosure, further reduction of CS can be obtained by the use of filters or phosphors, which remove radiation in the CSR. However, the filters should be designed such that the resulting quality of light is still acceptable (indeed, it would be very easy to fully filter out any light below say 500 nm, thus achieving low CS but a very undesirable quality of light, i.e. chromaticity and CRI). For instance, it is desirable to retain a chromaticity on-Planckian or near-Planckian, and a CRI of 80 or above. In the following, we provide further details on the practical implementation of such embodiments.

In the following discussion, as a simplified figure of merit for circadian stimulation, we consider the fraction of the SPD in the CSR. For the sake of argument, we will use the range 430 nm to 490 nm as the CSR in the following illustrations. The discussion can easily be adapted to other ranges (or to more complex responses, such as an action spectrum with a given shape in a given spectral range). For illustration, a conventional blue-pumped LED with a CCT of 3000K and a CRI of 80 has about 12% of its power in said CSR.

FIG. 1A to FIG. 6B presents techniques for making and using circadian filters, according to certain specifications.

Using various techniques, notch filters can be designed to block light in a selected wavelength range, while providing high transmission in other ranges. For instance, it is common to stack multilayers of materials with varying optical indices to obtain notch filters. A common choice is a $SiO_x/NbO_x$ stack. Other materials can be considered, such as $TiO_x$, $TaO_x$, etc.). These stacks can be designed by optical software, using a relevant figure of merit such as low transmission in the CSR.

FIGS. 1A to 1D show such an example. FIG. 1A shows a dielectric stack deposited on a glass substrate (materials and thicknesses in nm). FIG. 1B shows the corresponding transmission curve. FIG. 1C shows how the initial SPD of a light source is modified into a filtered SPD when the filter is placed in front of it. FIG. 1D indicates corresponding colorimetric properties of the initial spectrum and of the filtered spectrum.

In this case, the initial spectrum is targeted on-Planckian at 3000K. The filter induces a slight chromatic shift (7 Du'v' points). The CRI is maintained at 80. The effect on these properties is moderate because the initial spectrum already had little radiation in the CSR. On the other hand, the reduction of power % in the CSR is substantial (more than tenfold). In comparison to a standard blue-pumped LED with the same CCT and CRI, the reduction in power in the CSR is sixty times. Other filter designs can achieve further reduction, or provide reduction in a different wavelength range as desired.

Figures 2A, 2B:
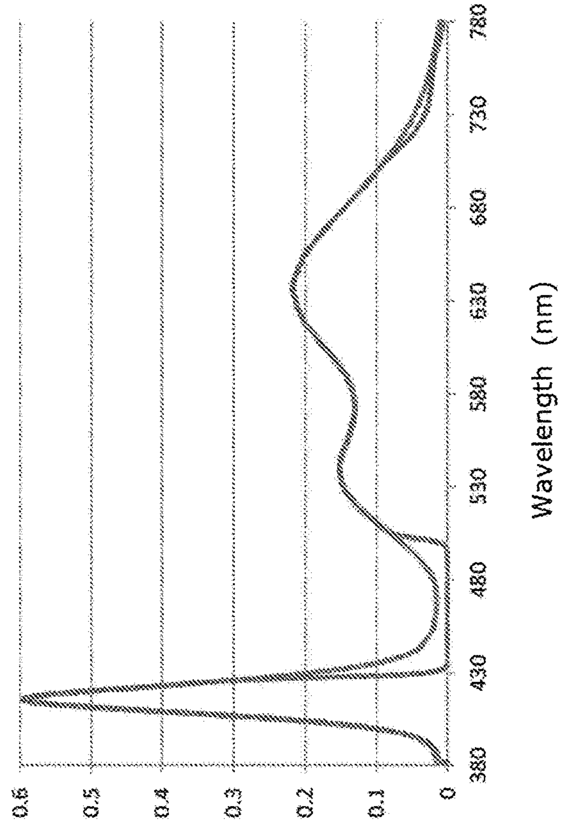
Figures 4A, 4B, 4C:
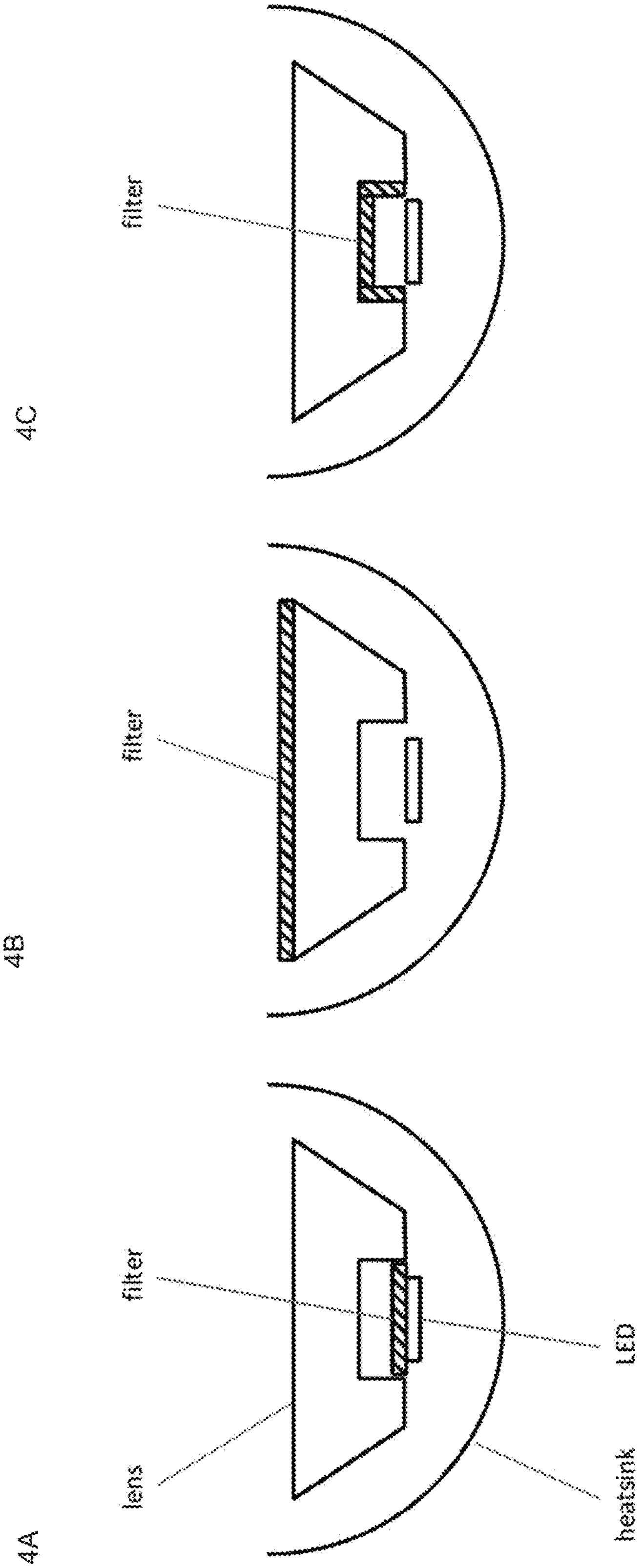

In other cases, one may want to ensure that the filtered SPD is on-Planckian. This can be achieved by starting from an off-Planckian initial SPD so that the chromatic shift of the filter brings the SPD on-Planckian. This is achievable by selecting the right choice and amount of phosphors to achieve a given chromaticity after filtering. FIGS. 2A and 2B illustrate this. Here the dielectric filter is the same as in FIGS. 1A-1D, but the initial SPD has been tuned so that the filtered SPD would be on-Planckian. FIG. 2A shows the initial SPD and the filtered SPD. FIG. 2B shows the corresponding colorimetric properties. Here again, the filtered SPD has an order of magnitude less power in the CSR than the initial SPD.

As an alternative, one may start from an on-Planckian light source and design a filter which has the proper transmission at all wavelengths to maintain the initial SPD's chromaticity.

Also note that in FIGS. 1A-1D and 2A-2B the initial SPDs have little radiation in the CSR, therefore the filtering has a very small impact on the system's efficiency, which is desirable.

Dichroic filters are especially suited when the light source is fairly directional, because their transmission usually varies with angle. Therefore they can be easily adapted to narrow-beam light sources. For instance they may be used on a spot lamp (such as a 4°, a 10° or a 20° spot). Such filters may be added to an existing light source. As discussed above, the filter can be designed to maintain the chromaticity of the light source (and other properties such as CRI etc. . . . ). In some embodiments, the spot lamp can be converted between a circadian-stimulating source and a circadian-friendly source by addition of the filter. This filter can be combined with a diffuser to obtain a wider beam angle.

In other cases one may want to use a non-directional light source. FIGS. 3A-B shows the effect of incidence angle for the filter of FIG. 1B coupled to the initial spectrum of FIG. 1C. FIG. 3A shows the transmission versus angle for the filter of FIGS. 1A-1D. The stop band shifts with incidence angle, as is typical in dichroic stacks. FIG. 3B shows how resulting colorimetric quantities vary with angle. The CRI and Du'v' vary rather strongly between 0° and 40°. Thus this filter would be suitable for a 10° beam angle, but less so for a 40° beam angle.

In such cases, the filtering may be adapted to function properly. This can be achieved by designing a dichroic stack where the figure of merit has low angular variation. FIGS. 3C-D show such an embodiment.

FIG. 3C shows the transmission versus angle for a dichroic filter which has been designed for low transmission in the CSR for angles between 0° and 40°. The corresponding table (FIG. 3D) shows that the colorimetric quantities (Ra, cct, Du'v') are more stable (using the same initial spectrum of FIG. 1C).

FIG. 3E shows the corresponding stack's details (materials and thicknesses in nm). The thickness of the filter in FIG. 3B has been limited below 4 um. Further improvements could be achieved by allowing a thicker filter.

For non-directional light sources, another approach is to use a filter which is inherently non-directional, for instance an absorbing filter. Many exiting color filters (such as commercial polyester filters) incorporate dyes with absorption in the CSR. Use of such a filter yields angle-independent absorption. In some embodiments, the filter and the SPD are designed in conjunction, in order to obtain a desired chromaticity for the filtered spectrum (with the same procedure used in FIGS. 2A-2B).

In some cases the system has a mechanical component such that the filter can be moved in and out of place, manually or automatically.

In the case of a lighting application, the filter can be placed at various positions in the system. FIG. 4 shows cross-sections of spot lamps with such embodiments. For instance, the filter may be placed on top of the LED module (4A), at the exit port of the lens (4B) or at the entrance port of the lens (4C).

Figures 5A, 5B:
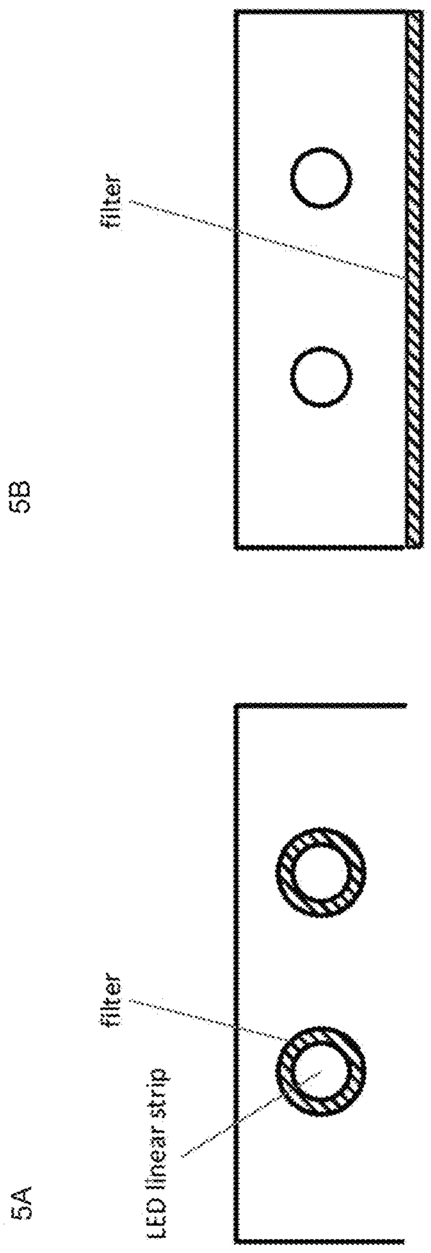
Figures 6A, 6B:
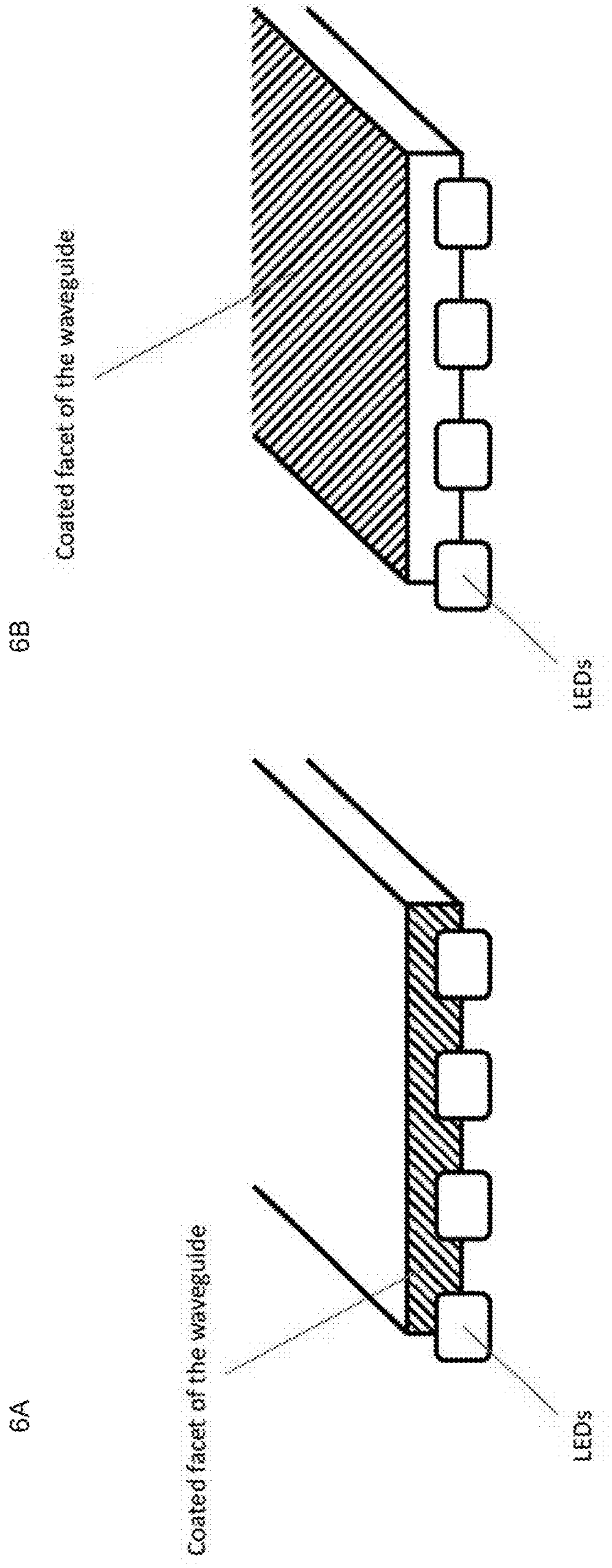
Figure 7:
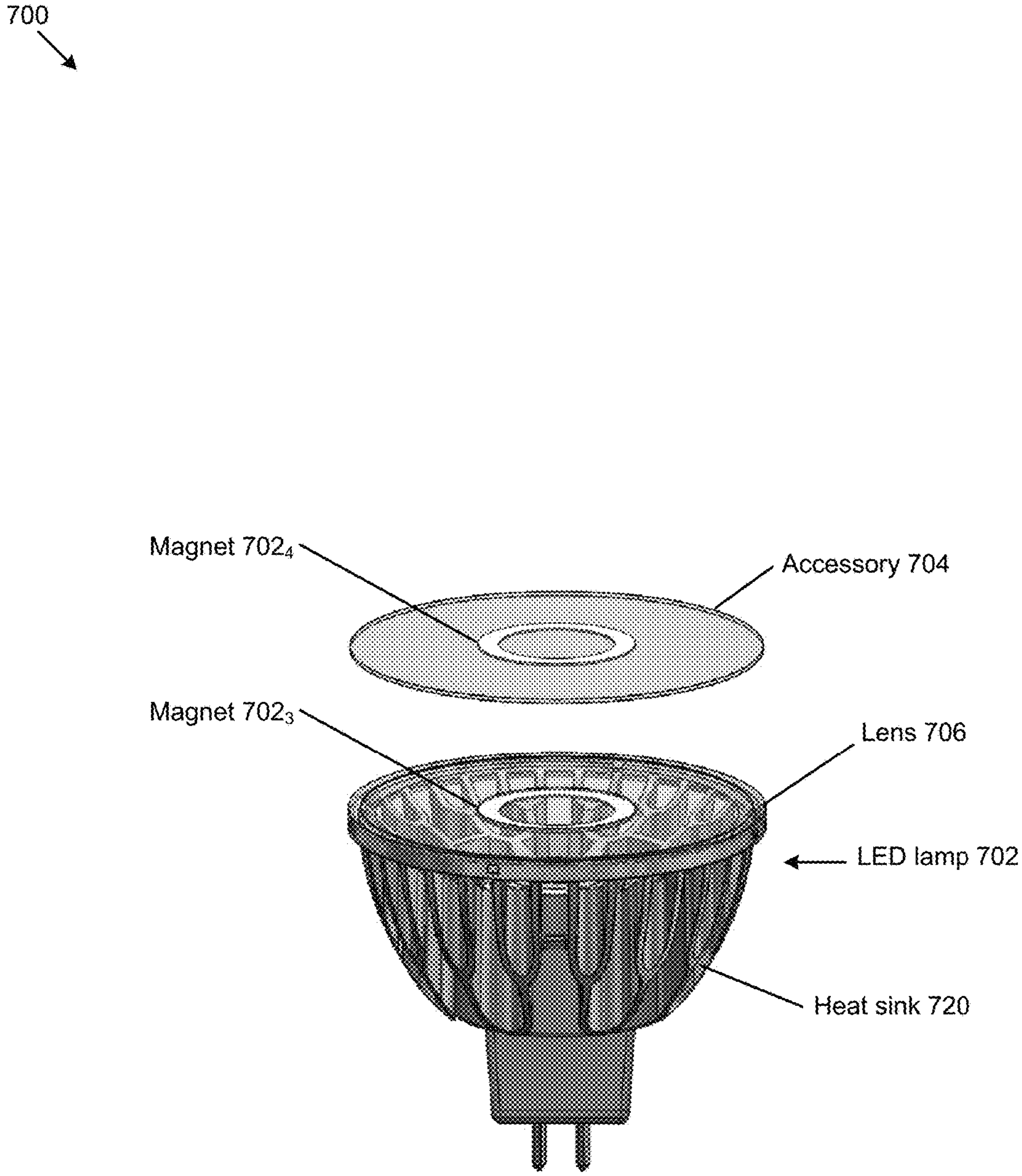
FIG. 7, FIG. 8, FIG. 9 and FIG. 10 provide circadian filters and properties of circadian filters used in combination with LED lamps, according to some embodiments.
Figure 8:
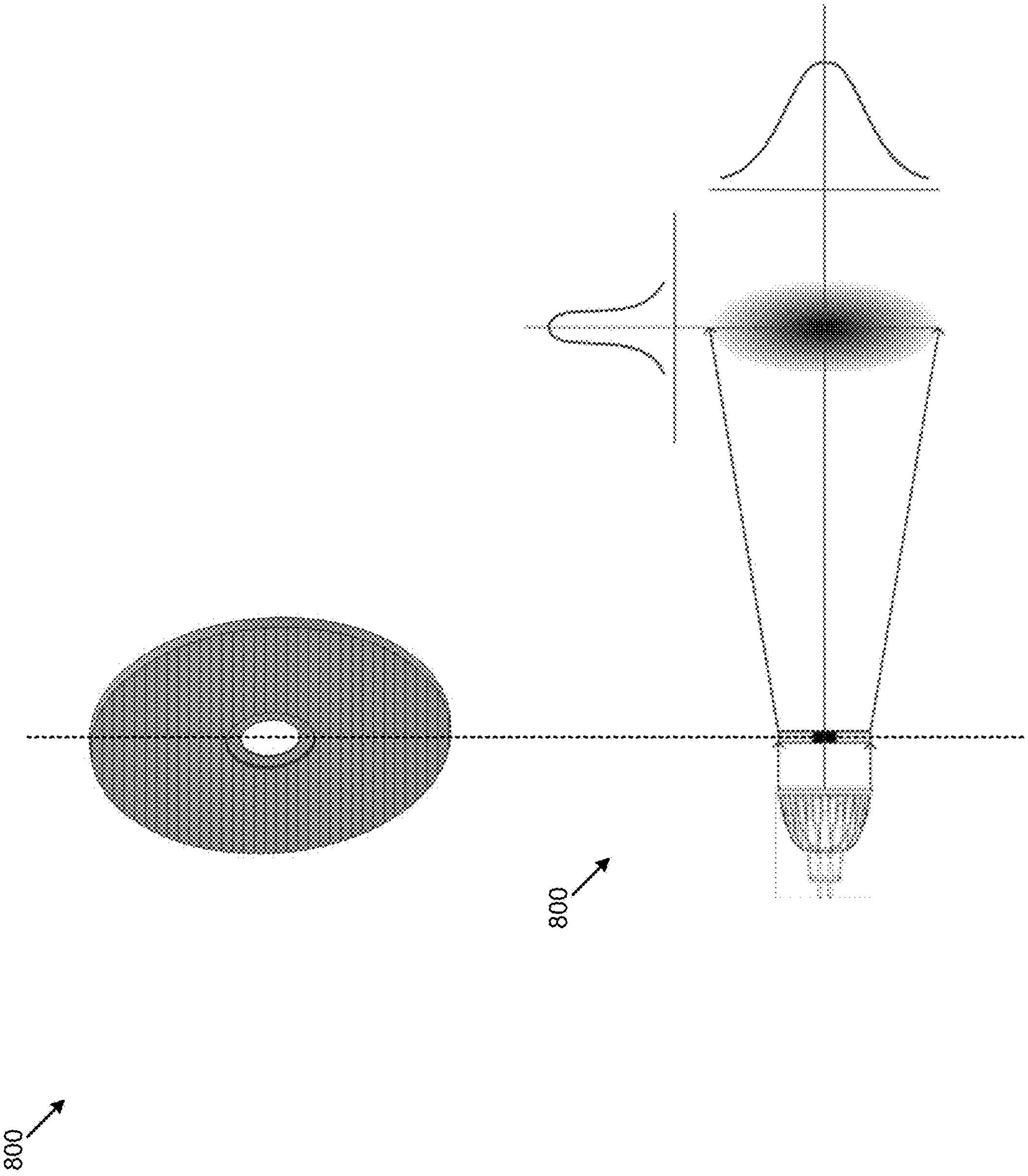
Figure 9:
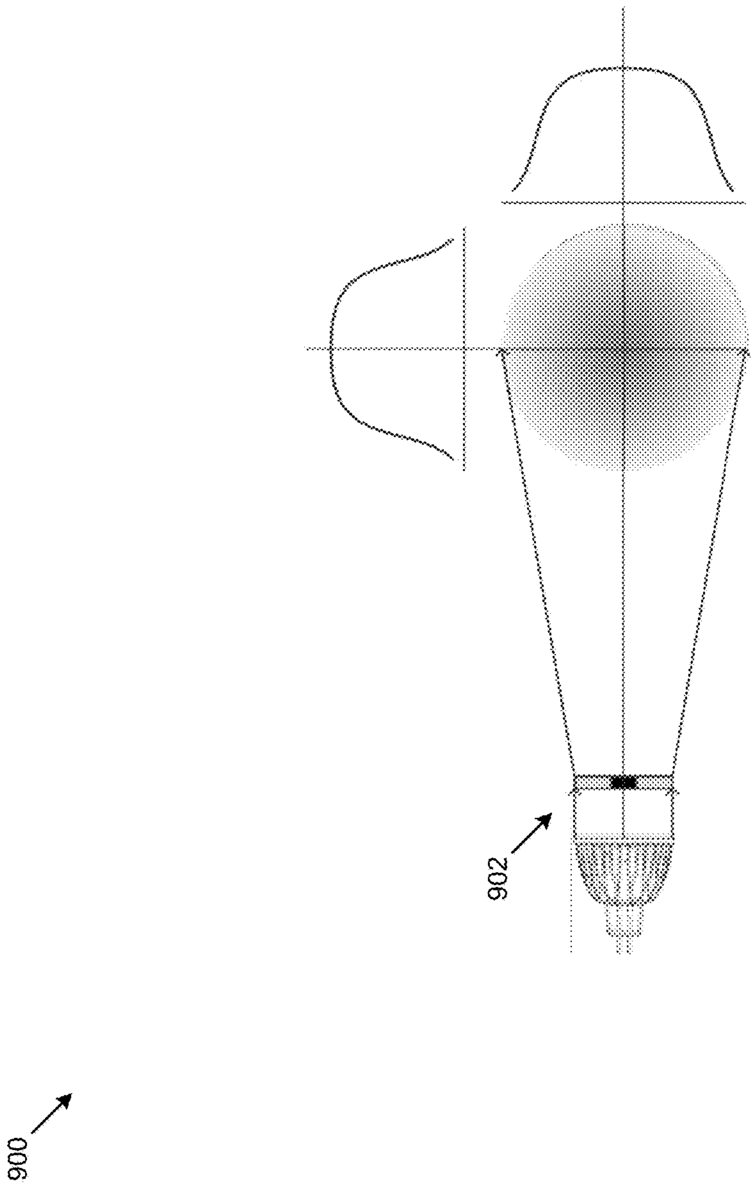
Figure 10:
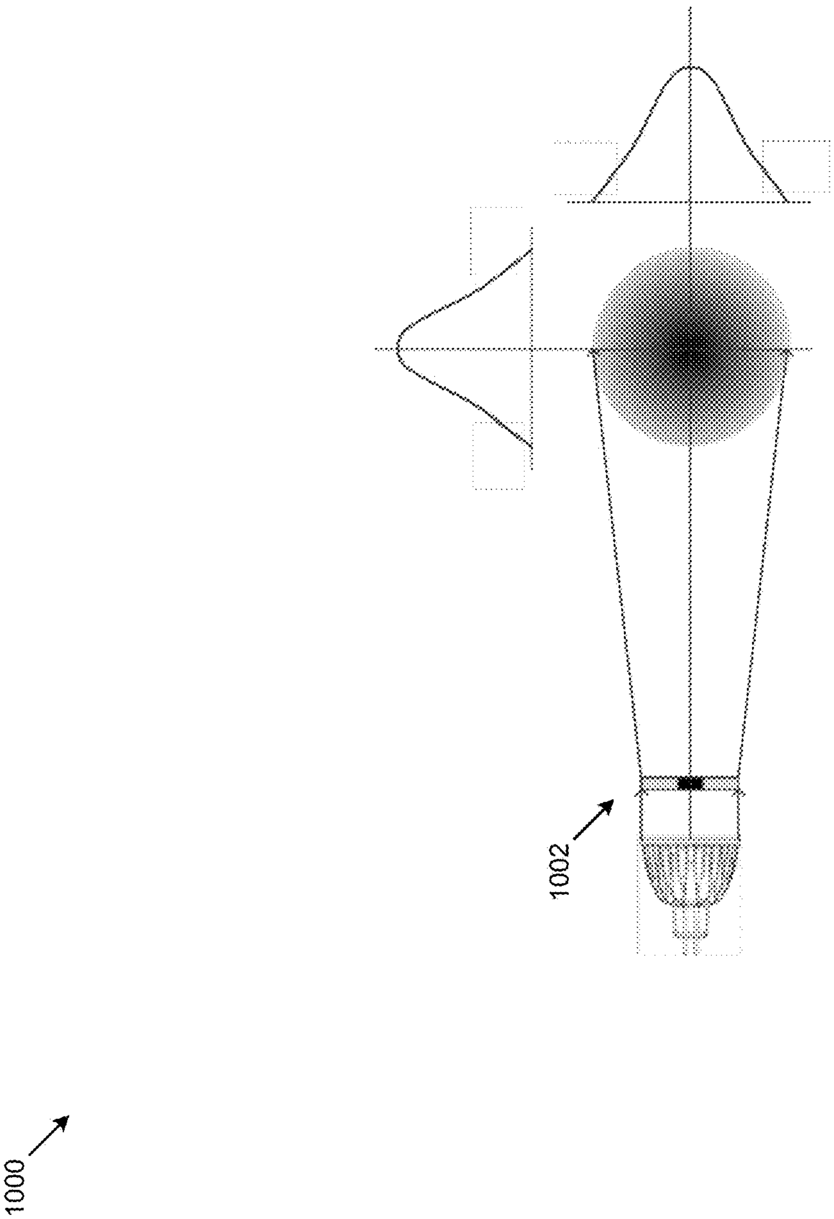

Likewise, in a troffer, the filter may be placed in front of the LEDs or at the exit port of the luminaire. FIG. 5A shows the cross-section of a troffer with linear LED strips and a filter around the LED strips. FIG. 5B shows a similar troffer with the filter at the luminaire's exit port.

In the case of applications with waveguide coupling (either for lighting or display), the filter can be placed at various positions in the system. For instance, in the case of a side-coupled display waveguide, the filter may be placed between the LEDs and the entrance of the waveguide; deposited on the coupling facet of the waveguide, as shown on FIG. 6A; deposited on the output facet of the waveguide as shown on FIG. 6B. Depending on the configuration, a directional filter (such as some dichroic stacks) or a non-directional filter (some as some dye absorber films) may be preferred. In other embodiments, the coupling between the LEDs and the waveguide may not be a direct butt-coupling but rather be accomplished by intermediate optics, such as prismatic lenses. In such cases the filter may be placed at various positions around the lens, similarly to FIGS. 4A-4C.

In various embodiments, the system may mix standard sources with high circadian stimulation and circadian-friendly sources with a filter achieving very low circadian stimulation.

As already mentioned, the discussion above uses a simplistic metric (fraction of SPD in the CSR). Other metrics can be used to design the filter, such as the fraction of power Fv in the violet range (for instance 400-440 nm), the fraction of power Fc in the cyan range (for instance, 440 nm to 500 nm) and their ratio. For instance, for the filtered spectrum of FIG. 2A, Fv=0.256, Fc=8E-4 and Fc/Fv=0.003. Other cyan ranges (such as 430 nm to 500 nm) could also be used.

FIG. 7 to FIG. 10 present variations using accessories (e.g., filters) in combination and/or in combination with LED lamps. Filters can be implemented with magnetic or other mating devices, and filters can be designed or combined to project emanated light in selected patterns of intensity.

Figure 11A:
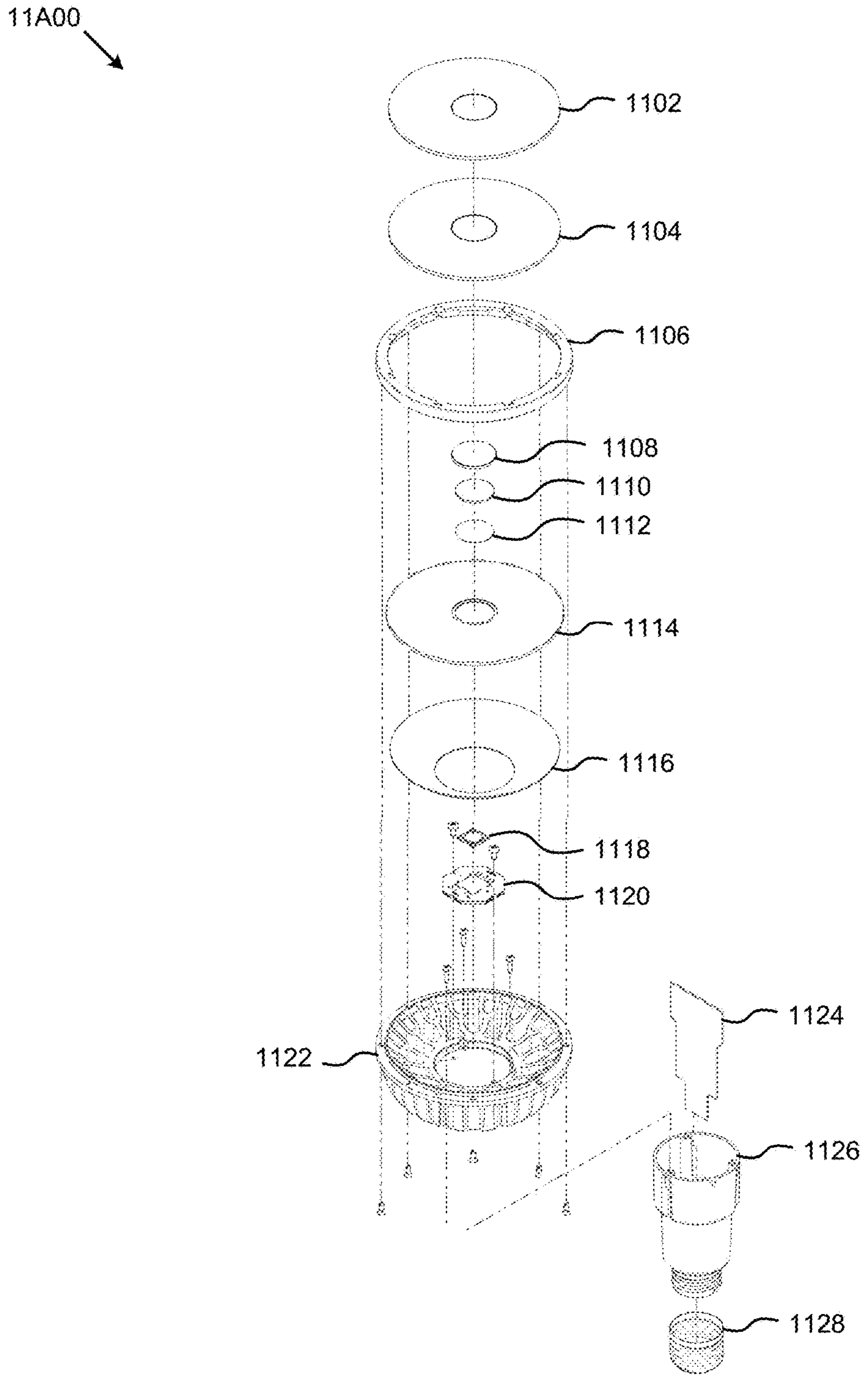
FIG. 11A shows an exploded view of an LED lamp used with an interchangeable retaining ring kit for mating to an LED lamp heatsink, according to some embodiments.

FIG. 11A shows an exploded view 11A00 of an LED lamp used with an interchangeable retaining ring kit for mating to an LED lamp heatsink.

In some embodiments, aspects of the present disclosure can be used in an assembly. As shown in FIG. 11A, the assembly comprises:

—a screw cap 1128
—a driver housing 1126
—a driver board 1124
—a heatsink 1122
—a metal-core printed circuit board 1120
—an LED lightsource 1118
—a dust shield 1116
—a lens 1114
—a reflector disc 1112
—a magnet 1110
—a magnet cap 1108
—a trim ring 1106
—a first accessory 1104
—a second accessory 1102

As shown, the heatsink 1122 and trim ring 1106 can be mated together. In some cases, the trim ring is mated to the heatsink using threads that are present on the trim ring, or using threads present in screw fasteners. Any fastener can be used to affix the trim ring to the heatsink, and different fastening techniques may offer varying degrees of thermal conductivity with the heat sink. A gasket may be used to form a seal between the heat sink and a trim ring.

The components of assembly 11A00 may be described in substantial detail. Some components are 'active components' and some are 'passive' components, and can be variously-described based on the particular component's impact to the overall design, and/or impact(s) to the objective optimization function. A component can be described using a CAD/CAM drawing or model, and the CAD/CAM model can be analyzed so as to extract figures of merit as may pertain to e particular component's impact to the overall design, and/or impact(s) to the objective optimization function. Strictly as one example, a CAD/CAM model of a trim ring is provided in a model corresponding to the drawing of FIG. 11C.

Figure 11B:
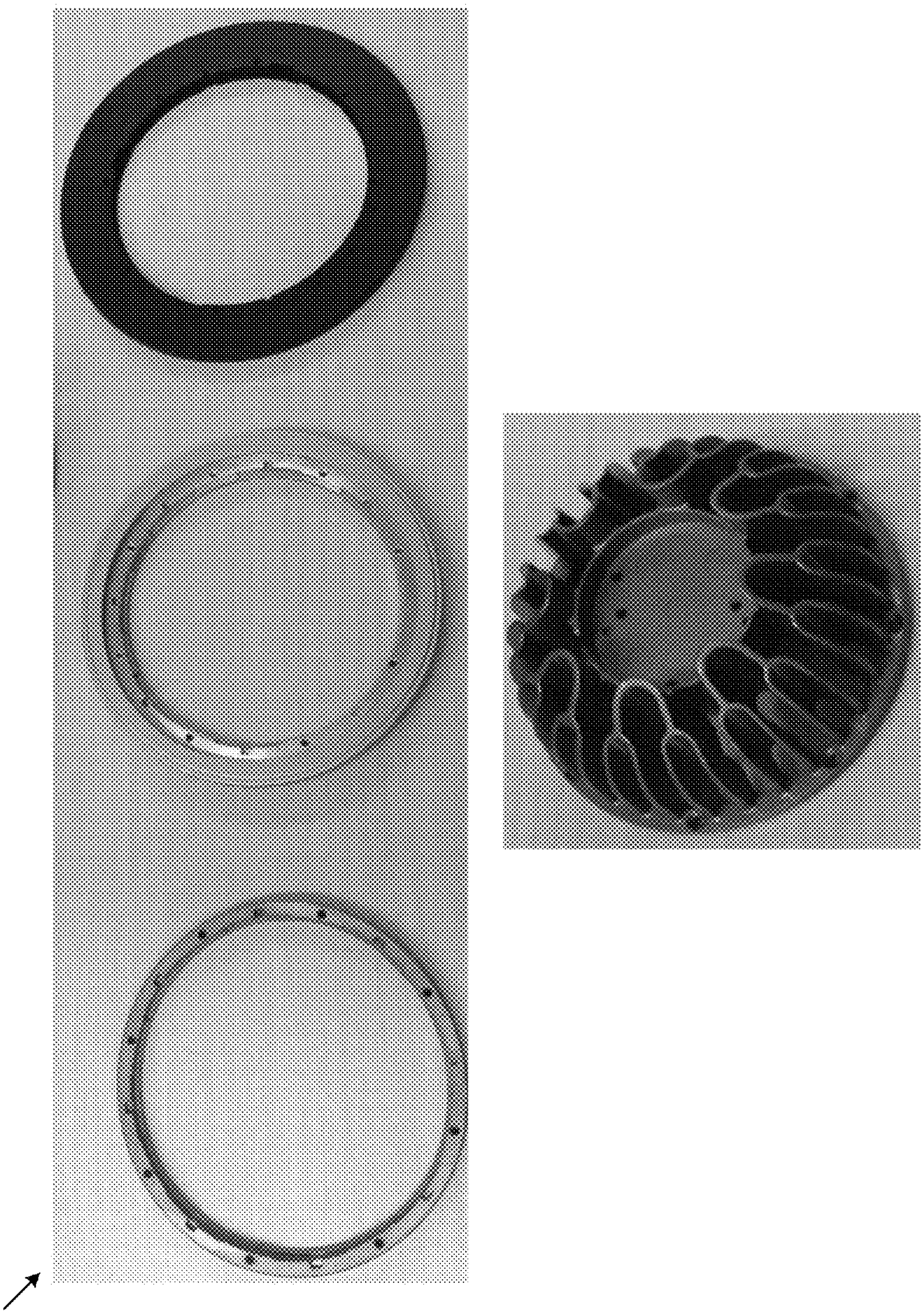
FIG. 11B shows a selection of rings included in an interchangeable retaining ring kit for mating to an LED lamp heatsink, according to some embodiments.

FIG. 11B shows a selection of rings of a kit 11B00 showing an example of interchangeable retaining ring kit for mating to an LED lamp heatsink.

As shown, a set of trim rings may be combined into a kit such that one or another trim ring can be selected for use with a particular lamp and a particular luminaire. For example the kit of FIG. 11B (top), contains three trim rings as follows:

A thin trim ring (top left) for use with a PAR30L form factor LED lamp and a luminaire of type PAR30L.

A thin trim ring (top center) for use with a PAR30L form factor LED lamp and a luminaire of type AR111.

A thin trim ring (top right) for use with a PAR38 form factor LED lamp and a luminaire of type PAR38.

Figure 11C:
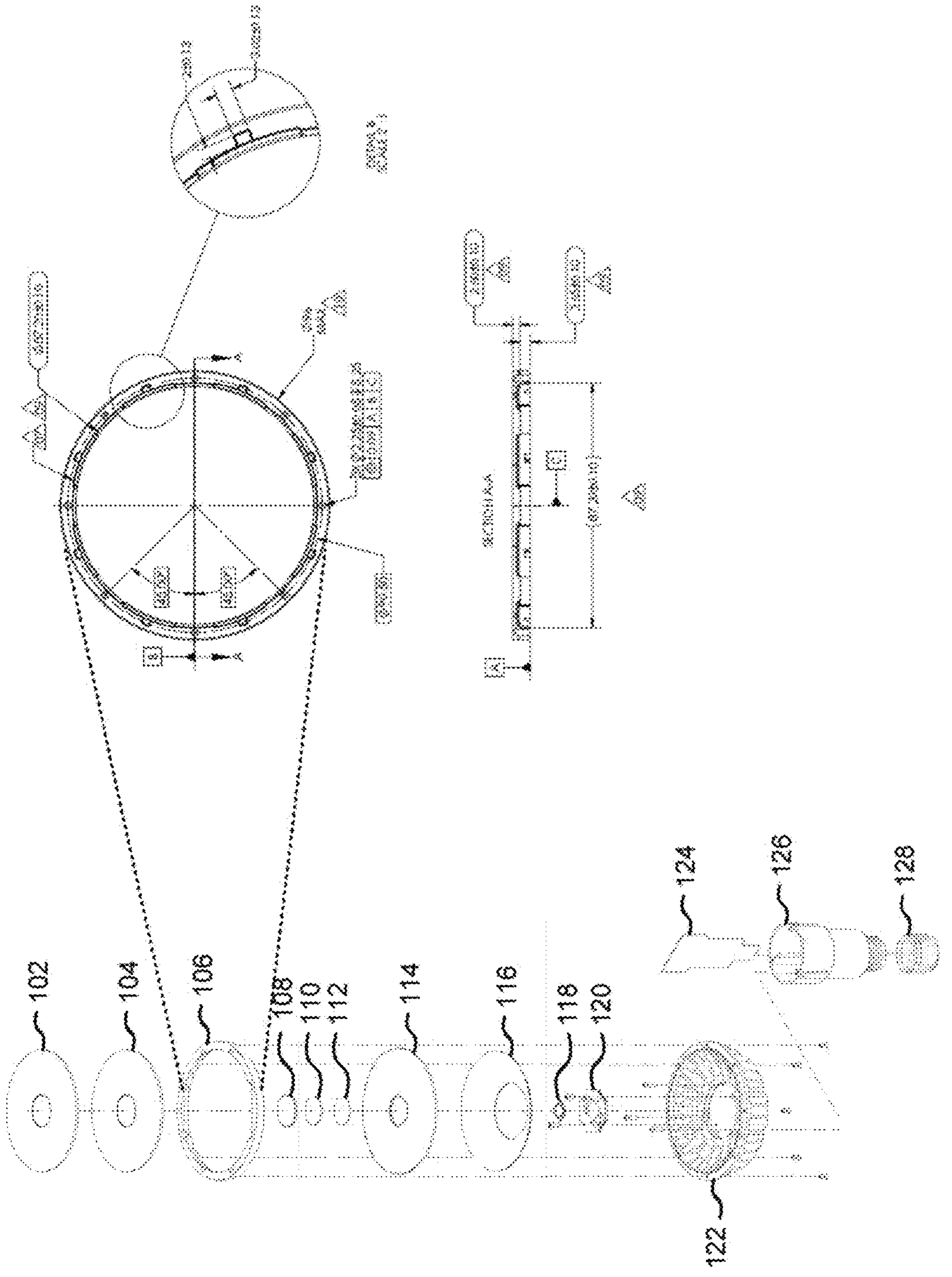
FIG. 11C shows details of certain components within an interchangeable retaining ring kit, according to some embodiments.

FIG. 11C includes a mechanical drawing inset showing detail of an example component within a interchangeable retaining ring kit for mating to an LED lamp heatsink, according to some embodiments.

A particular trim ring may have a mechanical design so as to provide a positive contact with adjacent components. In particular, a trim ring may contain undulations or detents to facilitate thermal conductivity between the heatsink and any surrounding structures, possibly including the housing of the luminaire.

The particular size and shape of the trim ring may vary to facilitate any particular function, and/or the particular size and shape of the trim ring may vary to accommodate snap-on or other field-replaceable accessories. Examples of the foregoing functions include:

Holding the lens in place within the assembly.

Supporting a snap-on or other field-replaceable diffuser.

Enhance the function of the heatsink (e.g., conduct heat from the heatsink to other structural members and to the air interface).

Provide a mechanical mating between an American National Standards Institute (ANSI) ANSI-standard lamp and a compliant luminaire.

Provide a mechanical mating between an ANSI-standard compliant luminaire and a lamp.

Provide a mechanical mating between an International Electrotechnical Commission (IEC) IEC-standard lamp and a compliant luminaire.

Provide a mechanical mating between an IEC-standard luminaire and a compliant lamp.

Provide a mechanical mating between a National Electrical Manufacturers Association (NEMA) NEMA-standard luminaire and a compliant lamp.

Provide a mechanical mating between a NEMA-standard compliant luminaire and a NEMA-standard lamp.

The lamps depicted in the foregoing figures are merely examples of lamps that conform to fit with any one or more of a set of mechanical and electrical standards. Mechanical and electrical standards other than the ones depicted in the foregoing can be used without departing from the spirit of this disclosure.

Table 1 gives standards (see "Designation") and corresponding characteristics.

TABLE 1

| Designation | Base Diameter (Crest of thread) | Name | IEC 60061-1 standard sheet |
|---|---|---|---|
| E05 | 5 mm | Lilliput Edison Screw (LES) | 7004-25 |
| E10 | 10 mm | Miniature Edison Screw (MES) | 7004-22 |
| E11 | 11 mm | Mini-Candelabra Edison Screw (mini-can) | (7004-06-1) |
| E12 | 12 mm | Candelabra Edison Screw (CES) | 7004-28 |
| E14 | 14 mm | Small Edison Screw (SES) | 7004-23 |
| E17 | 17 mm | Intermediate Edison Screw (IES) | 7004-26 |
| E26 | 26 mm | [Medium] (one-inch) Edison Screw (ES or MES) | 7004-21A-2 |
| E27 | 27 mm | [Medium] Edison Screw (ES) | 7004-21 |
| E29 | 29 mm | [Admedium] Edison Screw (ES) | |
| E39 | 39 mm | Single-contact (Mogul) Giant Edison Screw (GES) | 7004-24-A1 |
| E40 | 40 mm | (Mogul) Giant Edison Screw (GES) | 7004-24 |

Additionally, the base member of a lamp can be of any form factor configured to support electrical connections, which electrical connections can conform to any of a set of types or standards. For example Table 2 gives standards (see "Type") and corresponding characteristics, including mechanical spacing between a first pin (e.g., a power pin) and a second pin (e.g., a ground pin).

TABLE 2

| Type | Standard | Pin center to center | Pin Diameter | Usage |
|---|---|---|---|---|
| G4 | IEC 60061-1 (7004-72) | 4.0 mm | 0.65-0.75 mm | MR11 and other small halogens of 5/10/20 watt and 6/12 volt |
| GU4 | IEC 60061-1 (7004-108) | 4.0 mm | 0.95-1.05 mm | |
| GY4 | IEC 60061-1 (7004-72A) | 4.0 mm | 0.65-0.75 mm | |
| GZ4 | IEC 60061-1 (7004-64) | 4.0 mm | 0.95-1.05 mm | |
| G5 | IEC 60061-1 (7004-52-5) | 5 mm | | T4 and T5 fluorescent tubes |
| G5.3 | IEC 60061-1 (7004-73) | 5.33 mm | 1.47-1.65 mm | |
| G5.3-4.8 | IEC 60061-1 (7004-126-1) | | | |
| GU5.3 | IEC 60061-1 (7004-109) | 5.33 mm | 1.45-1.6 mm | |
| GX5.3 | IEC 60061-1 (7004-73A) | 5.33 mm | 1.45-1.6 mm | MR16 and other small halogens of 20/35/50 watt and 12/24 volt |
| GY5.3 | IEC 60061-1 (7004-73B) | 5.33 mm | | |
| G6.35 | IEC 60061-1 (7004-59) | 6.35 mm | 0.95-1.05 mm | |
| GX6.35 | IEC 60061-1 (7004-59) | 6.35 mm | 0.95-1.05 mm | |
| GY6.35 | IEC 60061-1 (7004-59) | 6.35 mm | 1.2-1.3 mm | Halogen 100 W 120 V |
| GZ6.35 | IEC 60061-1 (7004-59A) | 6.35 mm | 0.95-1.05 mm | |
| G8 | | 8.0 mm | | Halogen 100 W 120 V |
| GY8.6 | | 8.6 mm | | Halogen 100 W 120 V |
| G9 | IEC 60061-1 (7004-129) | 9.0 mm | | Halogen 120 V (US)/ 230 V (EU) |
| G9.5 | | 9.5 mm | 3.10-3.25 mm | Common for theatre use, several variants |
| GU10 | | 10 mm | | Twist-lock 120/230-volt MR16 halogen lighting of 35/50 watt, since mid-2000s |
| G12 | | 12.0 mm | 2.35 mm | Used in theatre and single-end metal halide lamps |
| G13 | | 12.7 mm | | T8 and T12 fluorescent tubes |
| G23 | | 23 mm | 2 mm | |
| GU24 | | 24 mm | | Twist-lock for self-ballasted compact fluorescents, since 2000s |
| G38 | | 38 mm | | Mostly used for high-wattage theatre lamps |
| GX53 | | 53 mm | | Twist-lock for puck-shaped under-cabinet compact fluorescents, since 2000s |

The list above is representative and should not be taken to include all the standards or form factors that may be utilized within embodiments described herein.

FIG. 11C includes a mechanical drawing inset 11C00 showing detail of an example component within a interchangeable retaining ring kit for mating to an LED lamp heatsink.

Following the foregoing, a trim ring may have certain specifications for mating, and such specifications may be defined in conjunction with the mechanical specifications of a heatsink. For example, protrusions and/or depressions, or flanges and/or openings, or zig-zag undulations and/or zag-zig undulations can be specific to a trim ring, and/or a heatsink. Several embodiments can be described as follows:

Embodiment 1

An interchangeable retaining ring kit for mating to an LED lamp heatsink, comprising:

i. a first trim ring having a first form factor; and ii. a second trim ring having a second form factor.

Embodiment 2

The interchangeable retaining ring kit of embodiment 1, wherein the first trim ring has protrusions configured to mate mechanically to depressions in the LED lamp heatsink.

Embodiment 3

The interchangeable retaining ring kit of embodiment 1, wherein the first trim ring has depressions configured to mate mechanically to protrusions in the LED lamp heatsink.

Embodiment 4

The interchangeable retaining ring kit of embodiment 1, wherein the first form factor has a first diameter and the second form factor has a second diameter, wherein the first diameter and the second diameter are different.

Embodiment 5

The interchangeable retaining ring kit of embodiment 1 wherein the first form factor has a first thickness and the second form factor has a second thickness, wherein the first thickness and the second thickness are different.

Embodiment 6

The interchangeable retaining ring kit of embodiment 1, further comprising at least one fastener to affix the first trim ring to the LED lamp heatsink.

Circadian filters can be used in combination with any lamp types, and/or with any mating or retaining structures. FIGS. 12A to 12I depict bulb form factors showing detail of lamps for using an interchangeable retaining ring kit.

As earlier discussed, the components of the assembly 11A00 can be fitted together to form a lamp. Such lamps may take the form factor of the lamps shown in FIG. 12A.

Figure 12A:
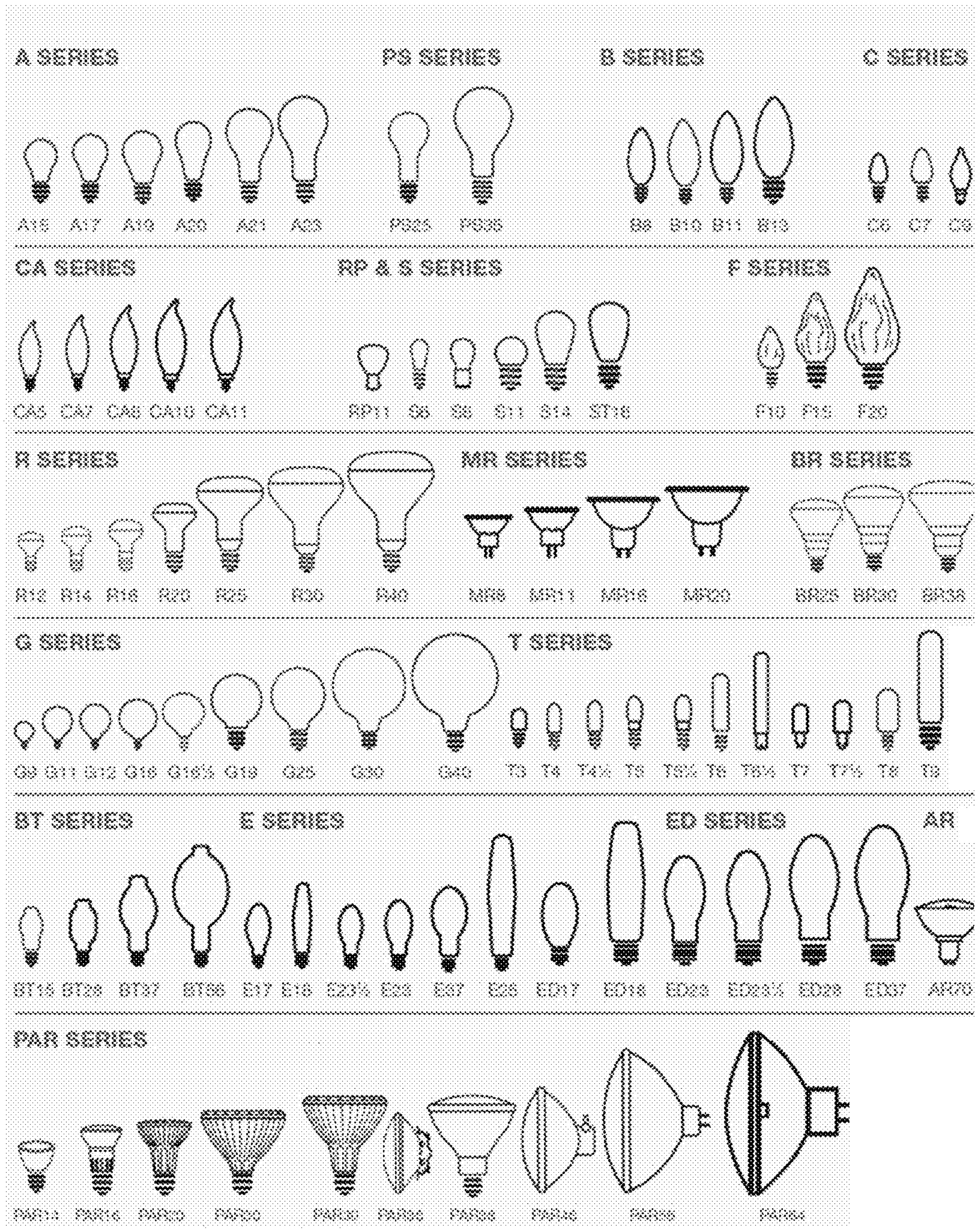
FIG. 12A to FIG. 12I depict bulb form factors showing detail of lamps for use with an interchangeable retaining ring kit, according to some embodiments.
Figure 12B:
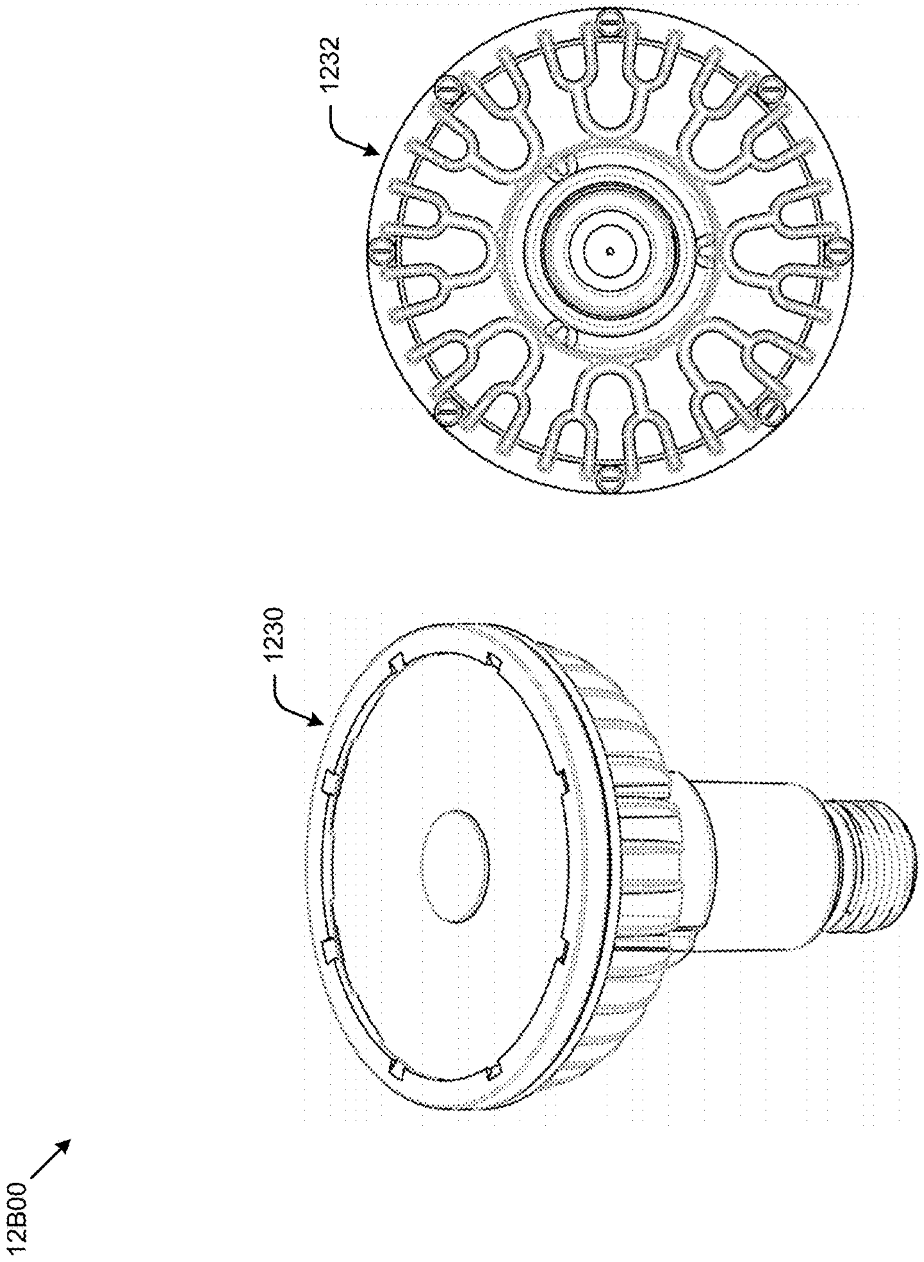
Figure 12C:
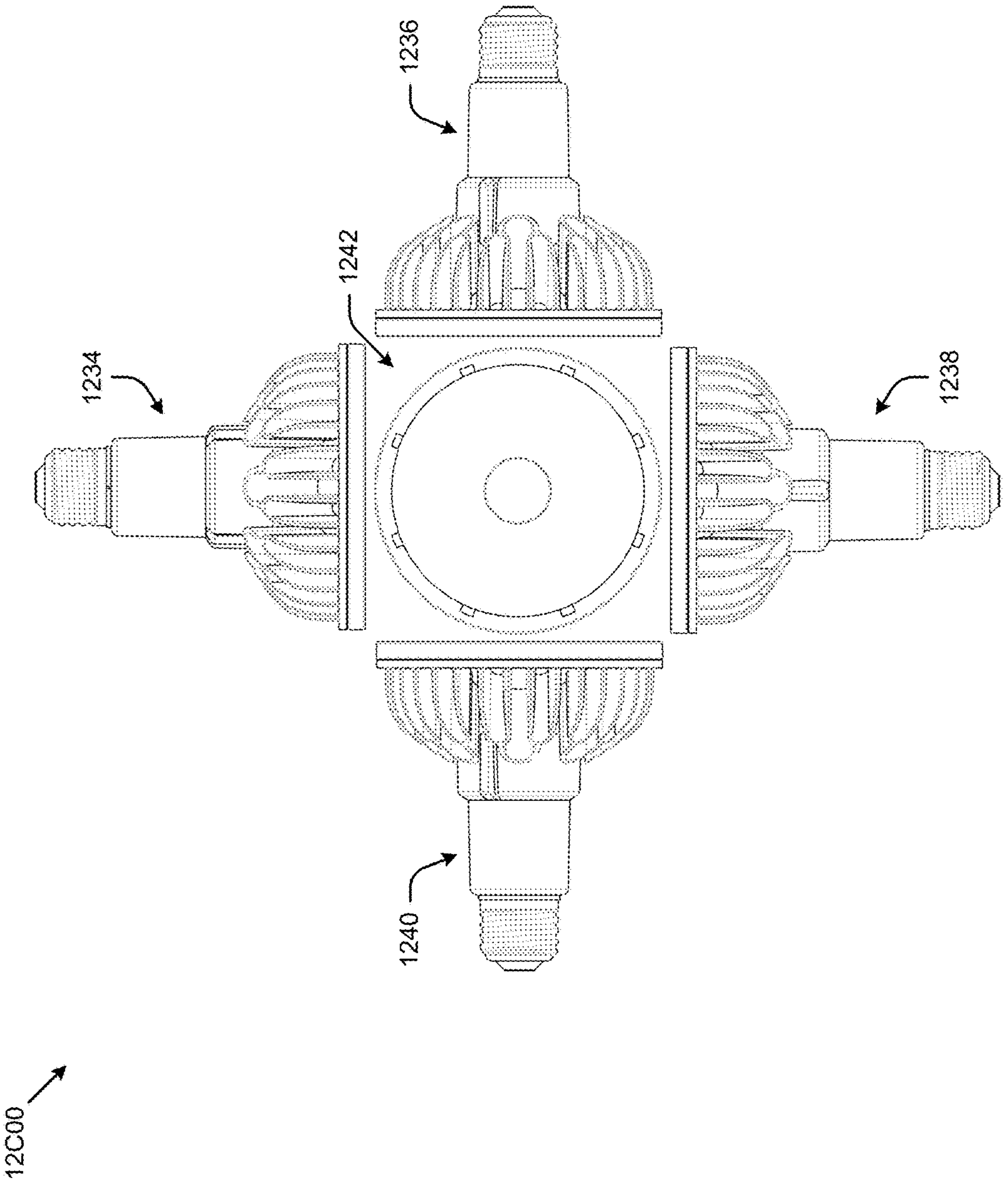

One type of lamp is known as a PAR lamp, and FIG. 12B depicts a perspective view 1230 and top view 1232 of such a lamp. Specifically, and as shown in FIG. 12B, the lamp 12B00 comports to a form factor known as PAR30L. The PAR30L form factor is further depicted by the principal views (e.g., left 1240, right 1236, back 1234, front 1238 and top 1242) given in array 12C00 of FIG. 12C.

Figure 12D:
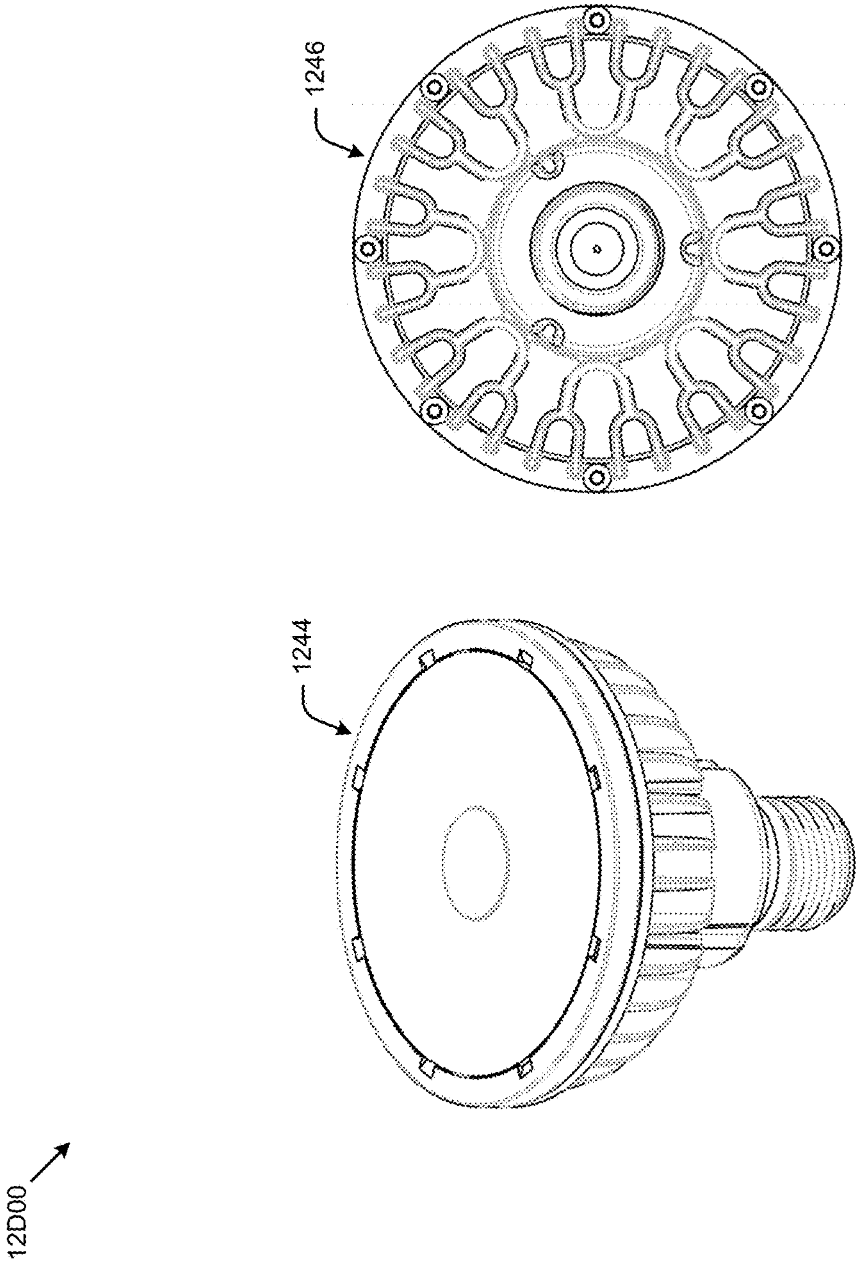
Figure 12E:
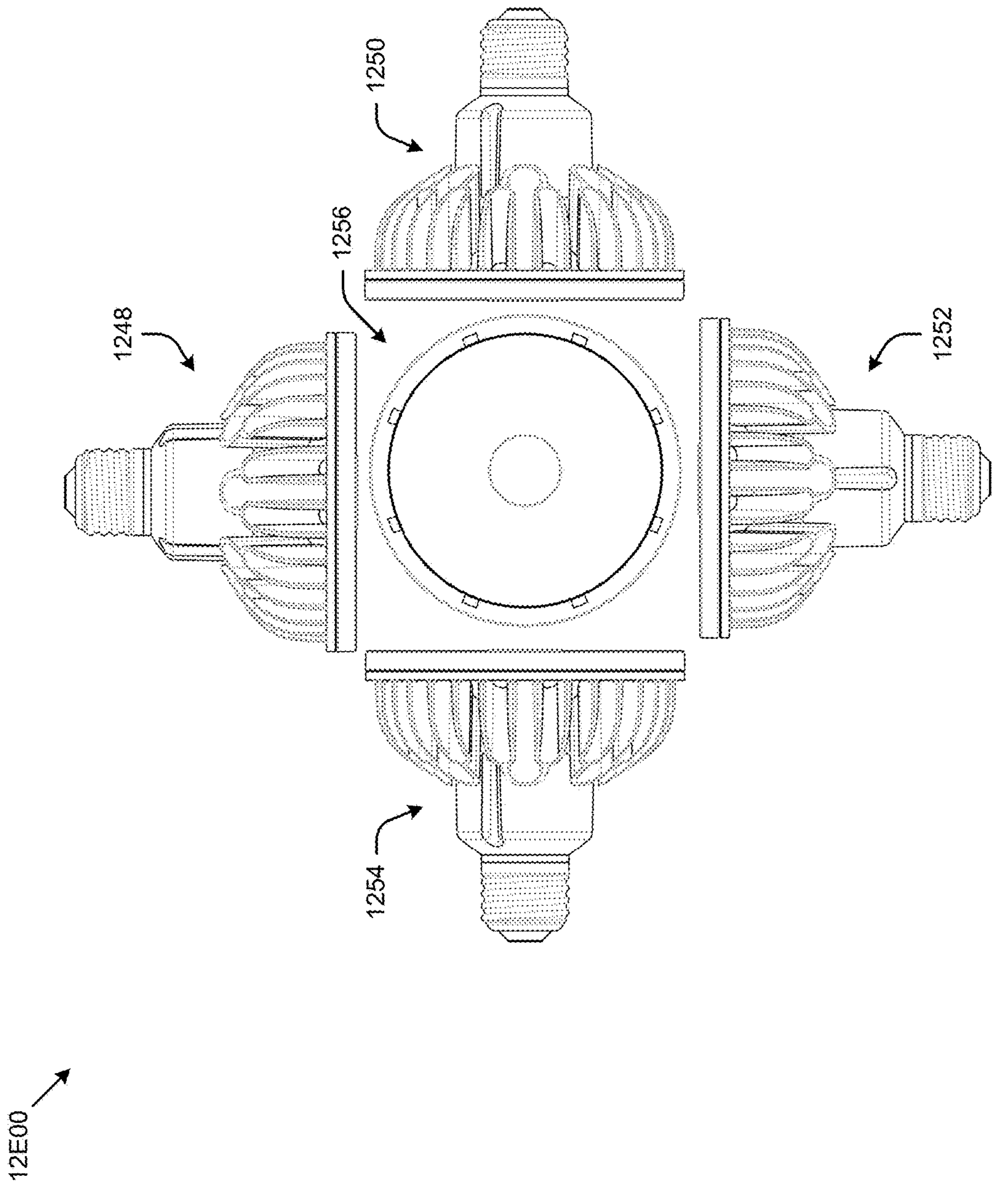

The components of the assembly 11A00 can be fitted together to form a lamp. FIG. 12D depicts a perspective view 1244 and top view 1246 of such a lamp. As shown in FIG. 12D, the lamp 12D00 comports to a form factor known as PAR30S. The PAR30S form factor is further depicted by the principal views (e.g., left 1254, right 1250, back 1248, front 1252 and top 1256) given in array 12E00 of FIG. 12E.

Figure 12F:
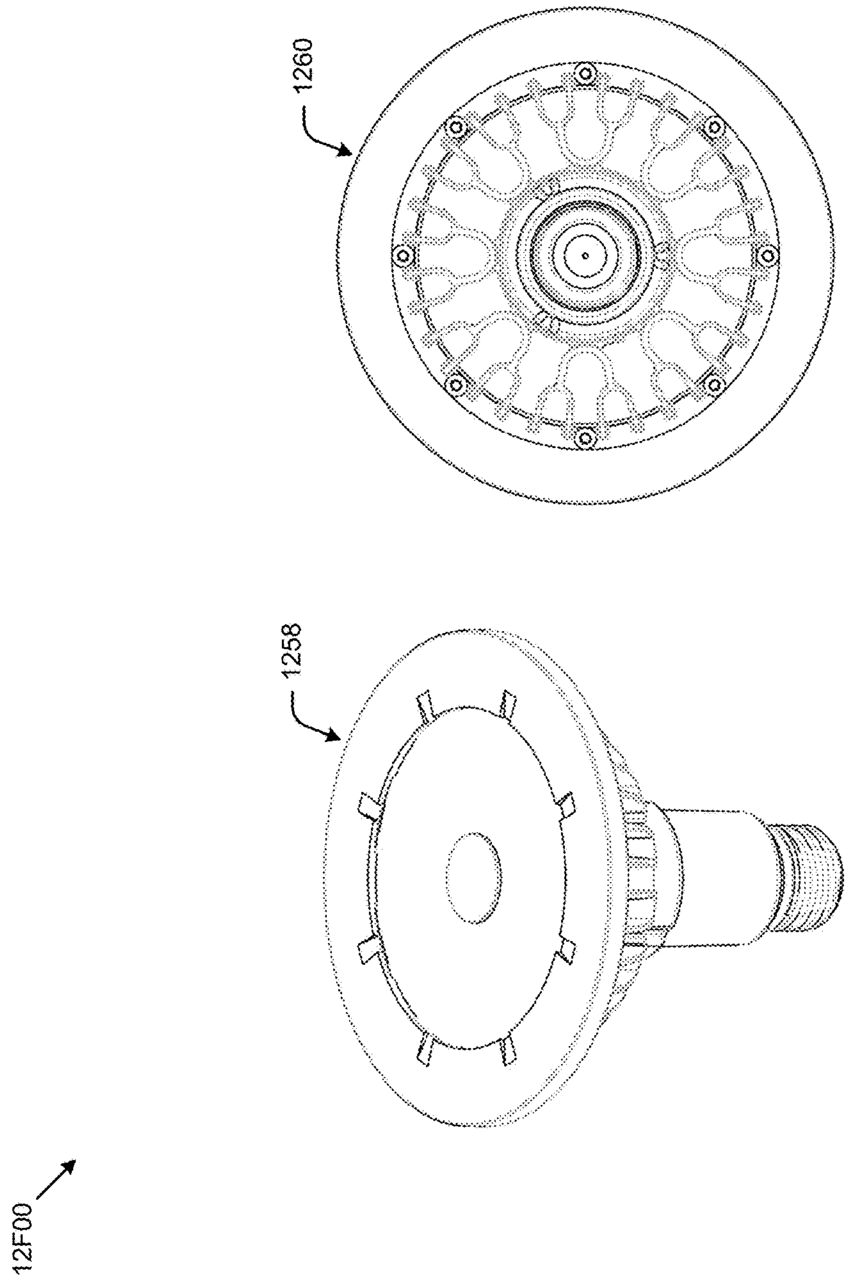
Figure 12G:
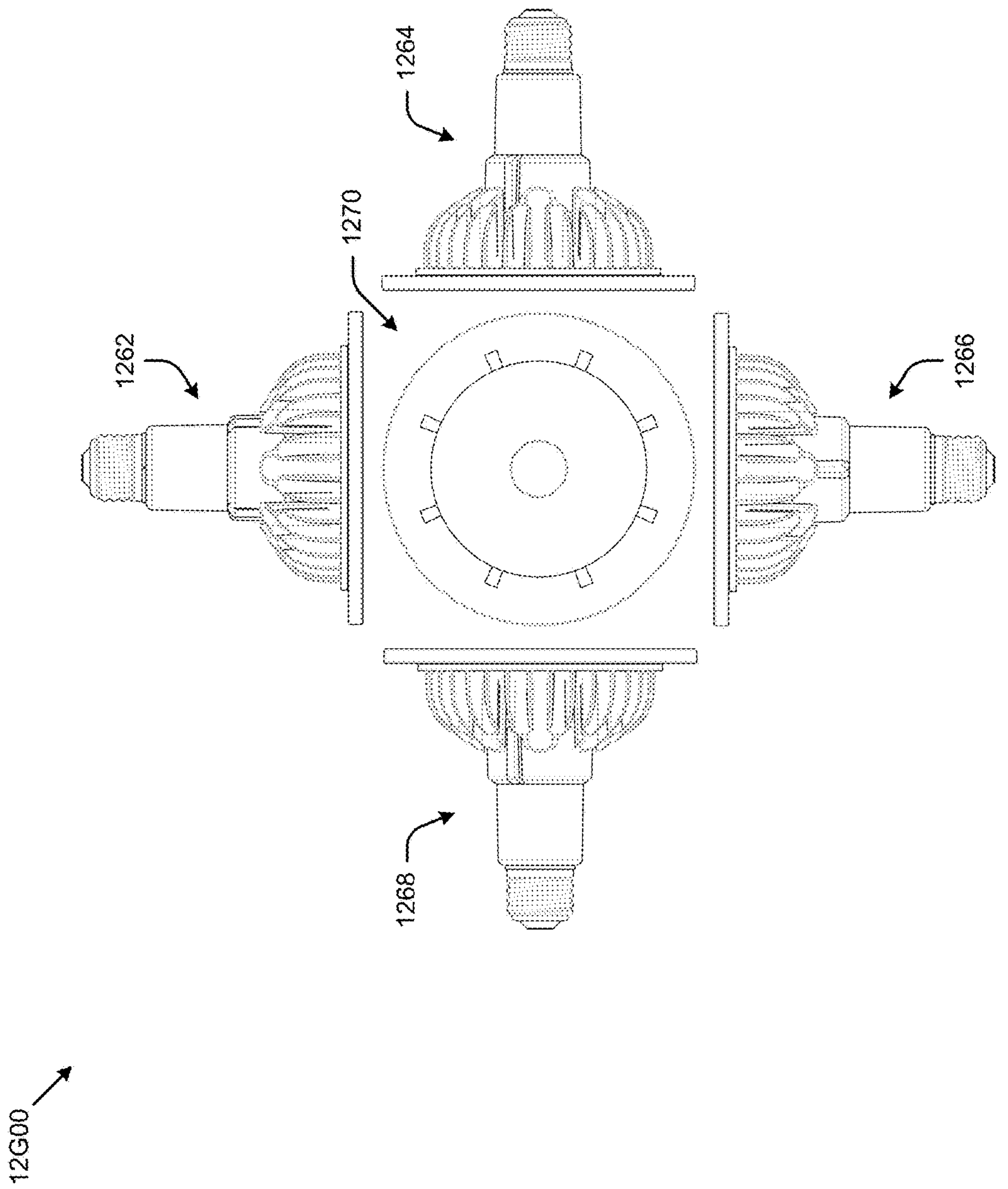

The components of the assembly 11A00 can be fitted together to form a lamp. FIG. 12F depicts a perspective view 1258 and top view 1260 of such a lamp. As shown in FIG. 12F, the lamp 12F00 comports to a form factor known as PAR38. The PAR38 form factor is further depicted by the principal views (e.g., left 1268, right 1264, back 1262, front 1266 and top 1270) given in array 12G00 of FIG. 12G.

Figure 12H:
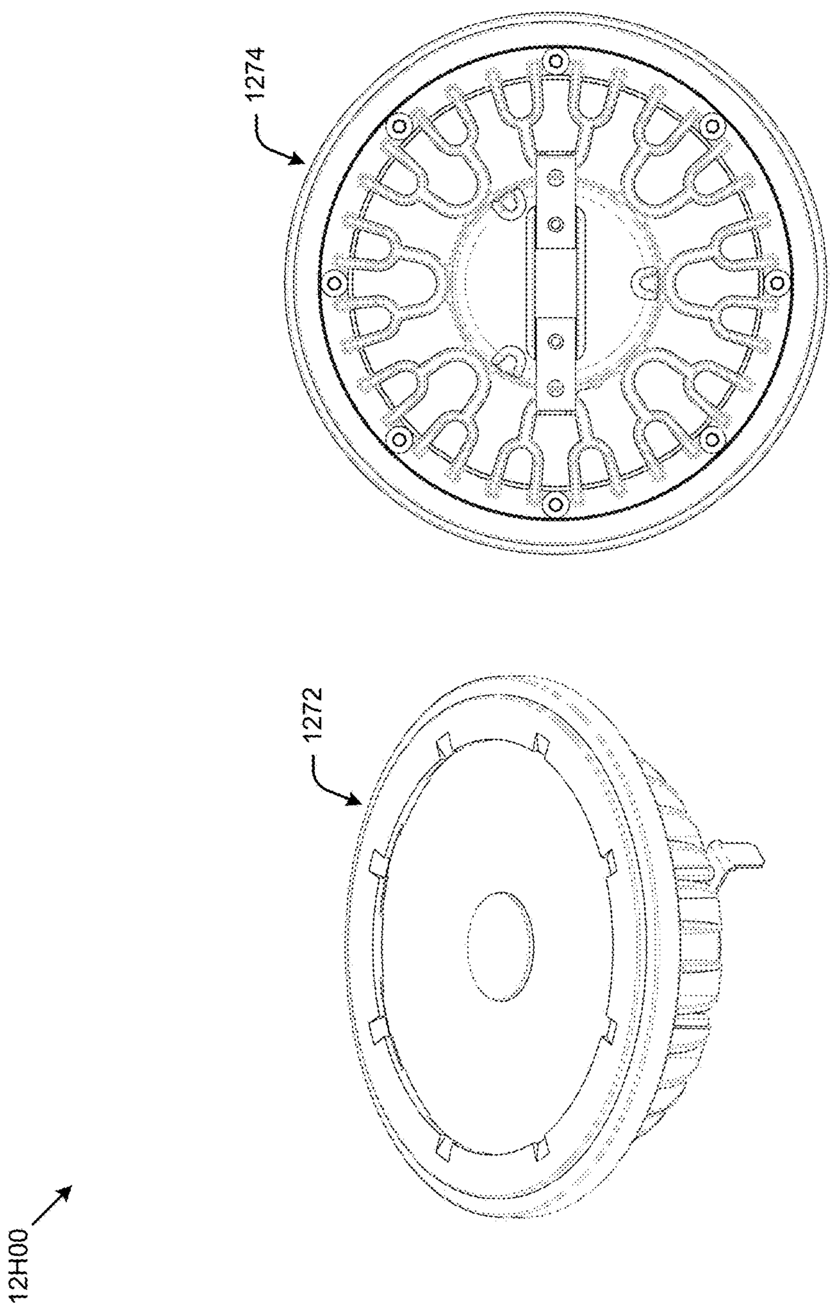
Figure 12I:
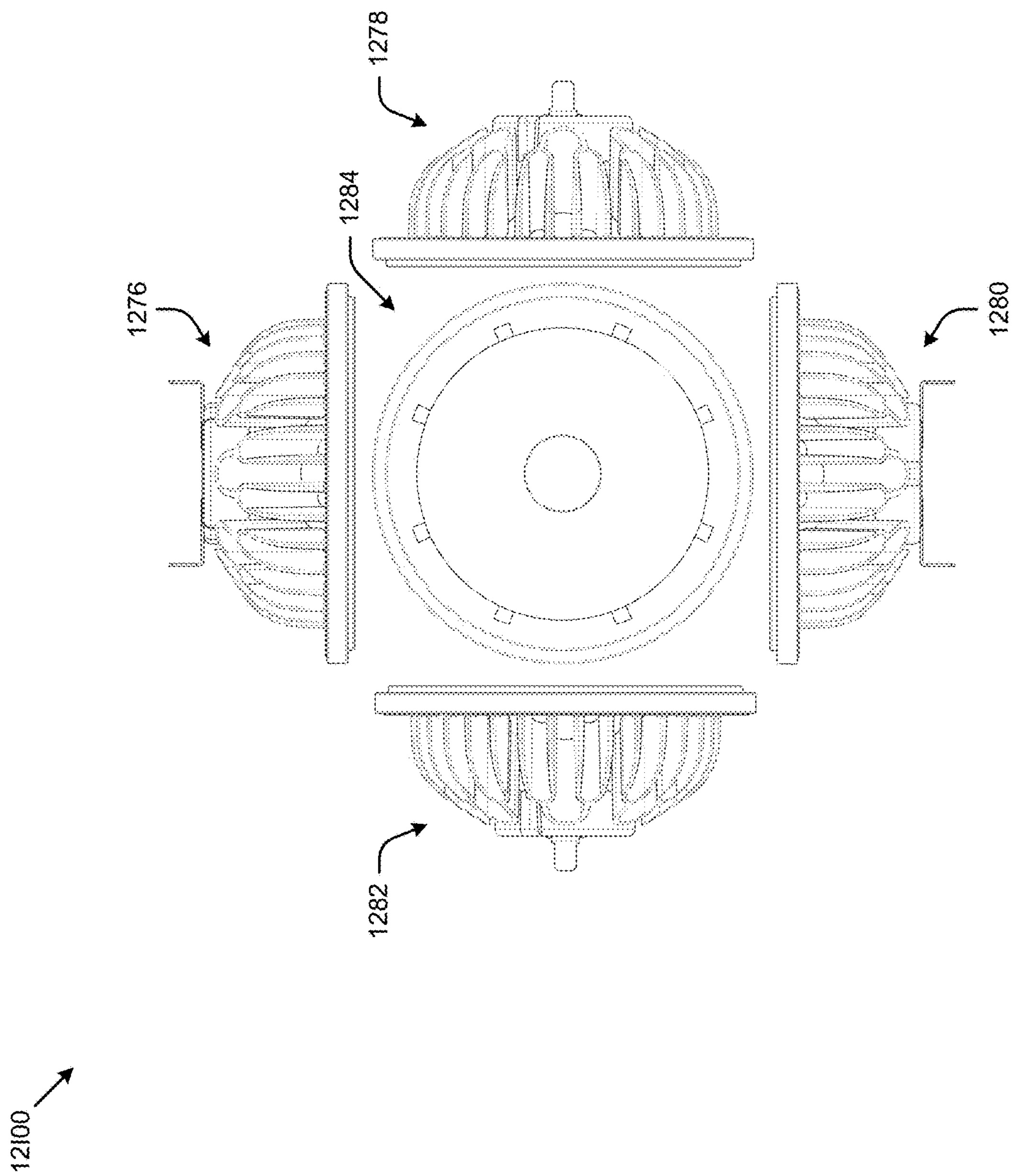

The components of the assembly 11A00 can be fitted together to form a lamp. FIG. 12H depicts a perspective view 1272 and top view 1274 of such a lamp. As shown in FIG. 12H, the lamp 12H00 comports to a form factor known as AR111. The AR111 form factor is further depicted by the principal views (e.g., left 1282, right 1278, back 1276, front 1280 and top 1284) given in array 12I00 of FIG. 12I.

Figures 13A, 13B:
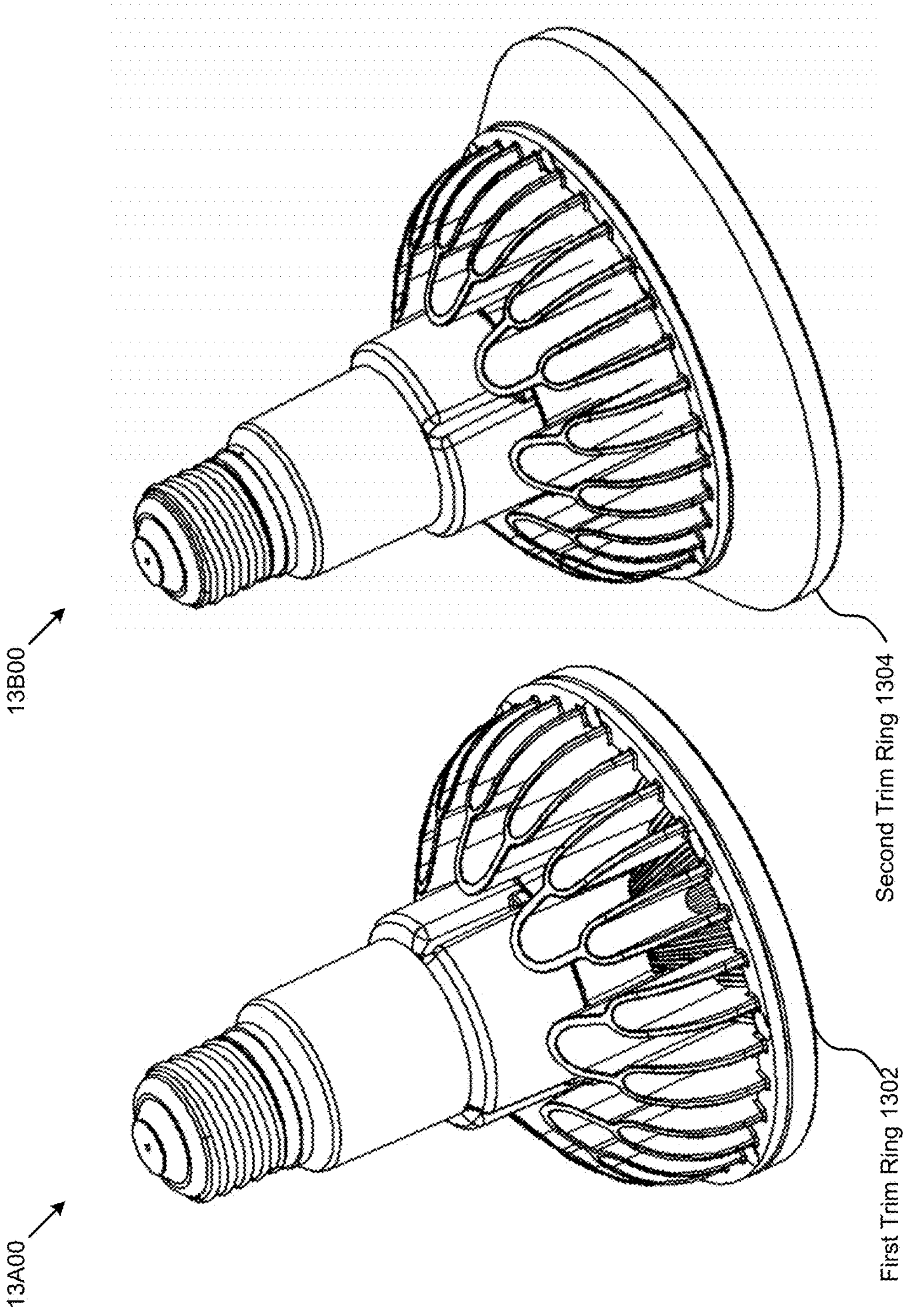
FIG. 13A and FIG. 13B show a lamp system having a trim ring installed, according to some embodiments.

FIGS. 13A and 13B provide images of a lamp system having a trim ring installed. As shown in FIG. 13A, a PAR30 lamp is fitted with a first trim ring 1302 from a kit 11B00. The assembly 13A00 can be installed into a luminaire. As shown in FIG. 13B, a PAR38 lamp is fitted with a second trim ring 1304. The assembly 13B00 can be installed into a luminaire. Both the first trim ring 1302 and the second trim ring 1304 are delivered in a kit.

Figure 14B:
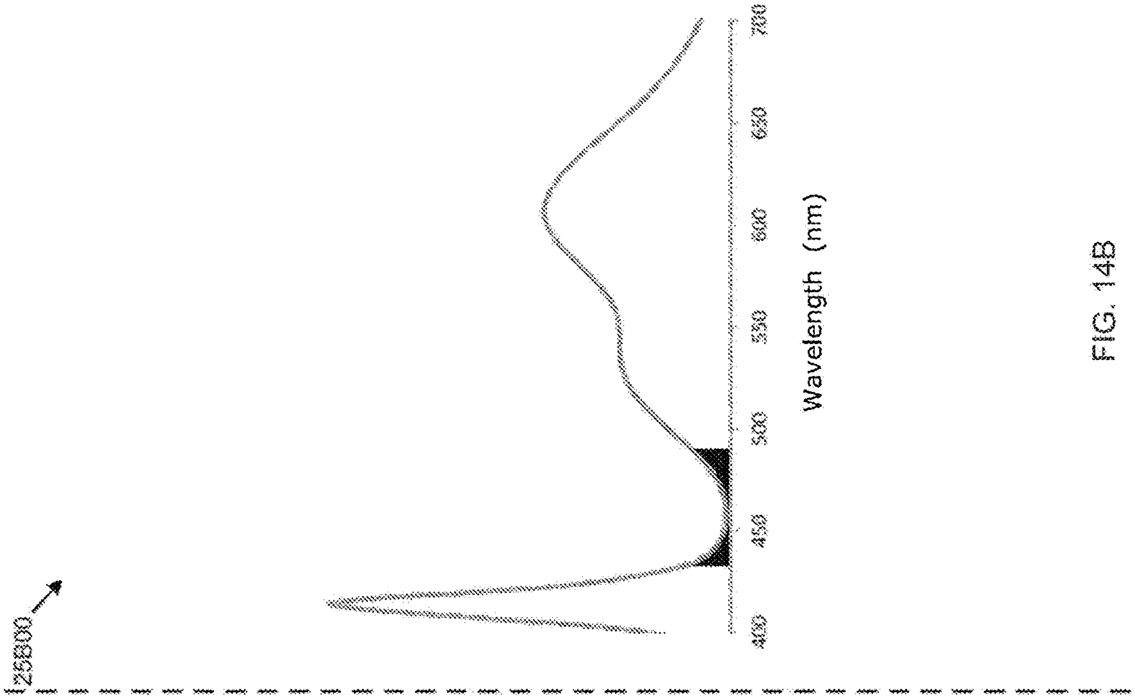
Figure 14A:
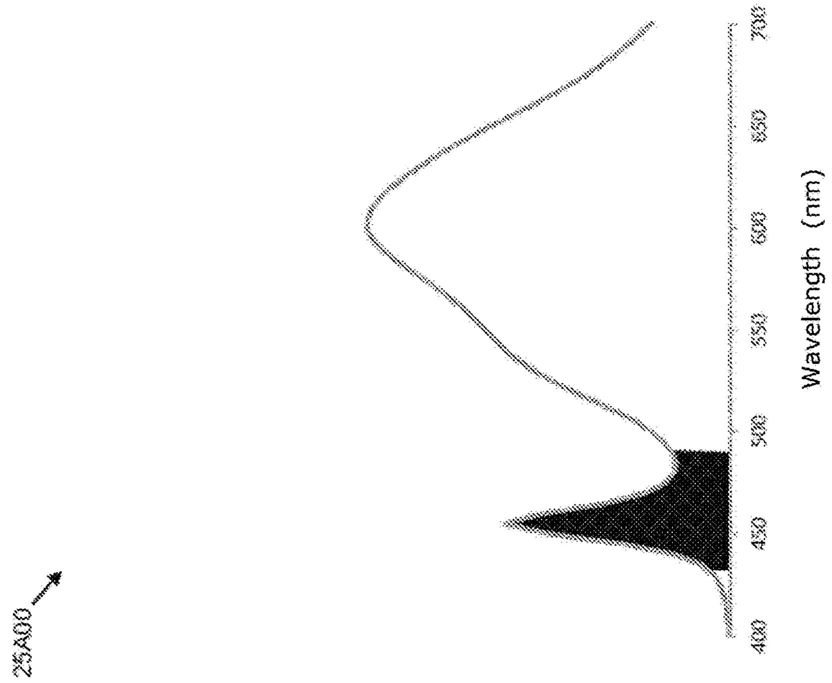

FIG. 14A to FIG. 14E illustrate additional advantages of combining a filter with a spectrum which already has only a small portion of radiation in the CSR. FIGS. 14A and 14B compare two filtered spectra. In these figures a CSR of 430-490 nm is assumed and the filter cuts off all radiation in this CSR. FIG. 14A is a standard source (specifically, a standard blue-pumped LED source) with a filter; although the presence of the filter ensures little radiation in the CSR, it also induces a significant loss of optical power (black region of FIG. 14A): 11% of the optical power is lost due to filtering. Other standard light sources, such as filament lamps, would incur similar losses with the same filter. In contrast, FIG. 14B shows an embodiment of the invention, combining a spectrum with little radiation in the CSR and a filter cutting off all residual radiation in the CSR. In this case, only 3% of the optical power in the spectrum is lost due to filtering. Therefore, embodiments of the invention may be more radiation-efficient than standard light sources using a filter to reduce circadian stimulation. For example, for the same starting radiated power levels for each of the light sources corresponding to FIGS. 14A and 14B, after filtering, more of the original radiation is retained for FIG. 14B as compared to FIG. 14A. In addition, since so much radiation is removed for the case of FIG. 14A, a large color shift is incurred (e.g., the light source is no longer white), which color shift is not easily corrected. In contrast, for the case of FIG. 14B, only a small chromaticity shift is caused by filtering, which can be easily corrected by slight compensating modifications to the primary violet light emission and/or the phosphor emission.

FIG. 14C and FIG. 14D are similar to the previous figures, but consider a slightly narrower CSR of 440-480 nm. Here again the filter cuts off all radiation in the CSR. When applied to a conventional source, the filter cuts off 8% of the total spectral power whereas when applied to a spectrum with little radiation in the CSR, only 1% of the total spectral power is lost. Therefore, energy savings can be achieved by embodiments combining a spectrum with little radiation in the CSR and a filter blocking light in the CSR, regardless of the specific value of assumed for the CSR.

In addition, the spectra of FIGS. 14A to 14E differ in their chromaticity. This is summarized in the table of FIG. 14E which shows the color coordinates (u'v') and the distance to the Planckian locus (Duv), for unfiltered spectra and for spectra filtered by the two filters considered above. Before filtering, both the conventional spectrum and the embodiment of the invention (with little radiation in the CSR) have a chromaticity which is close to the Planckian locus (the value of Duv is small). Application of the filter induces a chromatic shift, but this shift is more moderate for embodiments of the invention than for standard sources, which may be desirable. The chromatic shifts displayed by filtered standard sources correspond to a pronounced yellowish tint which may be undesirable.

As already mentioned, specific embodiments of the invention further reduce the value of Duv by combining a spectrum which is initially off-Planckian with a filter so that the resulting embodiment is nearly on-Planckian. By the same approach, other embodiments may also aim for a final chromaticity which is not on the Planckian locus, but is for instance below the Planckian locus instead.

In some embodiments of the invention, the optical power lost due to the addition of a filter is less than 8%, less than 5%, less than 3% or less than 1%. In some embodiments of the invention, the chromatic shift (in units of (u'v')) between the unfiltered and the filtered spectra is less than 10E-3, less than 2E-3, less than 1E-3. In some embodiments of the invention, the distance Duv to the Planckian locus of the filtered spectrum is less than 10E-3, less than 2E-3, less than 1E-3.

Figure 15A:
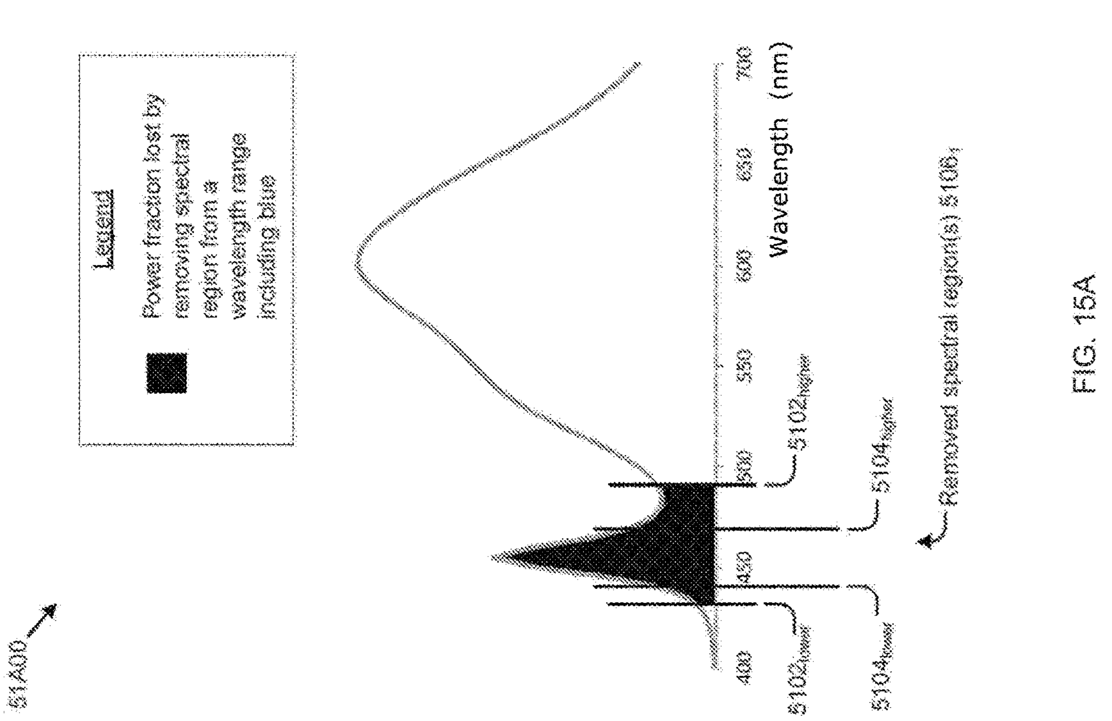
FIG. 15A and FIG. 15B illustrate reduced loss by providing a spectrum that already has only a small portion of radiation in the CSR.
Figure 15B:
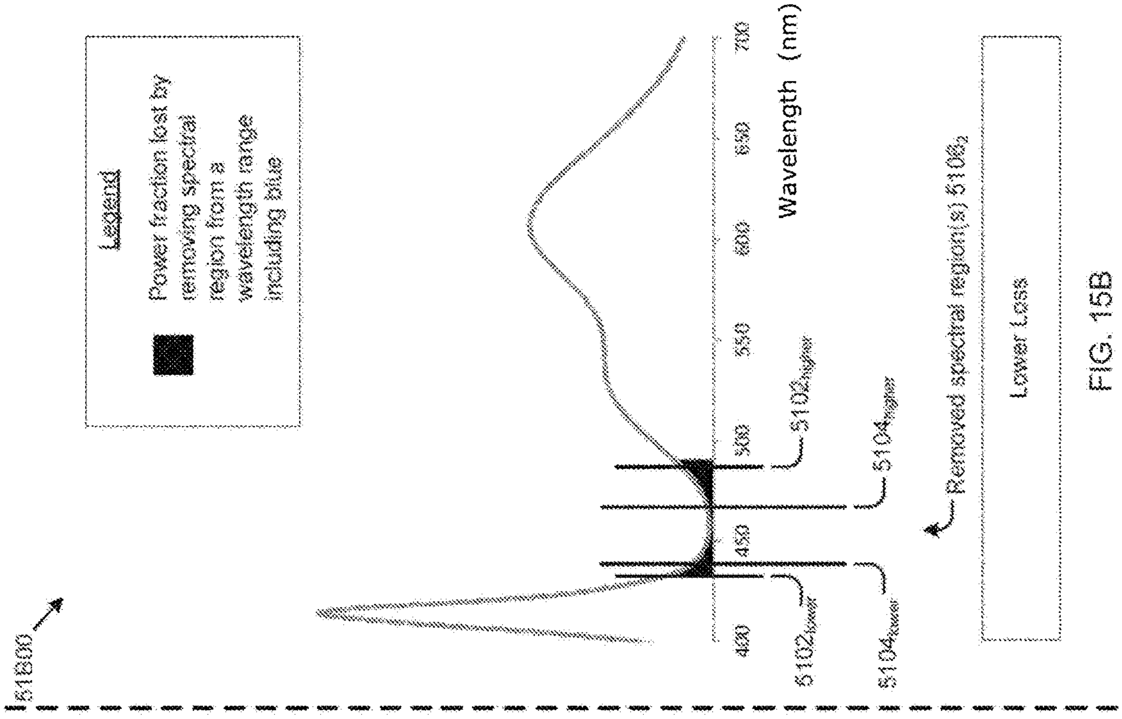

FIG. 15A and FIG. 15B illustrate reducing loss by generating a spectrum that already has only a small portion of radiation in the CSR, in cases wherein radiation within the CSR is desired to be completely or near-completely removed by absorption and/or filtering. The two original spectral power distributions are both observed by human viewers as having substantially the same chromaticity. In the case of FIG. 15A and FIG. 15B specifically, they are both white emitters (near the blackbody loci) and further demonstrate reasonably high color rendering (CRI of 80). This is possible since human visual sensation of blue light can be stimulated by blue light or a violet light. In many cases a relatively larger amount of power in violet ranges (FIG. 15B) produces the same human sensation as a relatively smaller amount of power in blue wavelength ranges (FIG. 15A).

However, filtering of emitted blue light (e.g., so as to completely or near-completely remove radiation in the CSR) as shown in FIG. 15A has the side effect of significantly reducing power efficiency of the corresponding lamp, as well as significantly changing its chromaticity (i.e., making the emission appear strongly yellow). In contrast, the spectral power distribution as shown in FIG. 15B does not produce a substantial amount of radiation in the CSR in the first place, and so does not suffer significantly reduced useful radiation when residual emission in the CSR is removed. Furthermore, its chromaticity is only slightly affected by removing light in the CSR and can be easily compensated for (to retain a white color point) through slight modifications to the phosphor and/or primary violet LED emissions.

As can now be understood, the foregoing embodiments describe a lamp system and techniques for making and using an interchangeable retaining ring kit. At least some of the components of the kit serve to mate to an LED lamp heatsink. In some assemblies, the lamp system comprises an LED lightsource configured to be disposed at least partially within the LED lamp heatsink, which is then fitted with a first trim ring having a first form factor (e.g., to conform to a first ANSI form factor). The interchangeable retaining ring kit comprises a second trim ring having a second form factor (e.g., to conform to a second ANSI form factor).

It should be noted that there are alternative ways of implementing the embodiments disclosed herein. Accordingly, the present embodiments are to be considered as illustrative and not restrictive, and the claims are not to be limited to the details given herein, but may be modified within the scope and equivalents thereof.

What is claimed is:

1. A light source comprising:

at least one LED having at least one emitter of blue or violet light and a plurality of wavelength converting materials configured to convert at least a portion of said blue or violet light to converted emissions having different wavelengths, wherein said LED emits an unfiltered emission of white light having an unfiltered chromaticity;

at least one notch filter configured to receive at least a portion of said unfiltered emission and having a transmission configuration to reduce circadian stimulation by removing a portion of said blue or violet light from said unfiltered emission to emit a final emission, said filtered emission having a filtered spectral power distribution (SPD) with a filtered power in the range 380-780 nm and with a blue fraction power in the range 430-500 nm, wherein said blue power fraction is less than 1% of said filtered power, and said filtered emission having a filtered chromaticity with a distance to the Planckian locus Du'v' of less than 0.01;

wherein an emission spectrum of said phosphor and said transmission configuration of said notch filter are jointly configured to result in a small a Du'v' distance between said pre-filtered chromaticity and said filtered chromaticity of less than 0.007.

2. The light source of claim 1, wherein said first wavelength corresponds to violet.

3. The light source of claim 2, wherein said filtered SPD has a violet fraction filtered power in the range 400-430 nm, of at least 5% of said filtered SPD.

4. The light source of claim 3, wherein the ratio of blue fraction filtered power to violet fraction filtered power is less than 0.1.

5. The light source of claim 1, wherein said filtered emission has a color rendering index greater than 80.

6. A light source comprising:

an LED having at least one emitter of blue or violet light and at least one phosphor, and being configured for emitting an unfiltered emission of white light said unfiltered emission having a unfiltered chromaticity and an unfiltered SPD with an unfiltered power in the range of 380-780 nm and with a blue fraction unfiltered power in the range of 430-500 nm, said blue fraction unfiltered power is less than 5% of said unfiltered power; and at least one optical element, including a notch filter to reduce circadian stimulation by removing a portion of said blue or violet light from said unfiltered emission, said at least one optical element being optically coupled to said LED source and configured to receive at least a portion of said unfiltered emission, said at least one optical element having a transmission configuration to remove radiation in the range of 430-500 nm from said unfiltered emission, resulting in a final emission having a final chromaticity and a final SPD with a final power in the range of 380-780 nm and a blue fraction final power in the range of 430-500 nm, said blue fraction final power being significantly reduced from said blue fraction unfiltered power such that said blue fraction final power is less than 1% of said final power, wherein an emission spectrum of said phosphor and said transmission configuration of said notch filter are jointly configured to result in a small Du'v' distance between said unfiltered chromaticity and said final chromaticity of less than 0.007.

7. The light source of claim 6, wherein said filtered SPD has a violet fraction filtered power in the range 400-430 nm of at least 5% of said filtered SPD.

8. The light source of claim 7, wherein the ratio of blue fraction filtered power to violet fraction filtered power is less than 0.1.

9. The light source of claim 6, wherein the final chromaticity has a distance to the Planckian locus Du'v' less than 0.01.

10. The light source of claim 6, wherein said blue fraction final power is less than 0.5% of said final.

11. The light source of claim 6, wherein a color rendering index Ra of the final emission is higher than 80.

12. The light source of claim 6, wherein the optical element is a filter.

13. The light source of claim 6, wherein the CCT of the unfiltered emission is in the range 2600-3500K.

14. The light source of claim 6, wherein the CCT of the filtered emission is in the range 2600-3500K.

* * * * *